US011137955B2

(12) United States Patent
Hirabayashi et al.

(10) Patent No.: US 11,137,955 B2
(45) Date of Patent: Oct. 5, 2021

(54) SERVER APPARATUS, PRINTING SYSTEM, AND MANAGEMENT METHOD

(71) Applicant: SEIKO EPSON CORPORATION, Tokyo (JP)

(72) Inventors: Tomoyoshi Hirabayashi, Matsumoto (JP); Ryo Oguchi, Shiojiri (JP); Tokio Kato, Shiojiri (JP); Tomoya Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/141,943

(22) Filed: Jan. 5, 2021

(65) Prior Publication Data

US 2021/0208825 A1 Jul. 8, 2021

(30) Foreign Application Priority Data

Jan. 8, 2020 (JP) .............................. JP2020-001288
Feb. 12, 2020 (JP) .............................. JP2020-021817

(51) Int. Cl.
*G06F 15/00* (2006.01)
*G06F 3/12* (2006.01)
*G06K 1/00* (2006.01)

(52) U.S. Cl.
CPC .......... *G06F 3/1229* (2013.01); *G06F 3/1204* (2013.01); *G06F 3/1285* (2013.01)

(58) Field of Classification Search
CPC ..... G06F 3/1229; G06F 3/1204; G06F 3/1285
USPC ................................ 358/1.1, 1.15, 1.13, 1.14
See application file for complete search history.

(56) References Cited

U.S. PATENT DOCUMENTS

| 2006/0181728 | A1* | 8/2006 | Mori ..................... G06F 21/608 358/1.14 |
| 2012/0249625 | A1* | 10/2012 | Asada .................. B41J 2/17546 347/3 |
| 2019/0310803 | A1 | 10/2019 | Kawano et al. |

(Continued)

FOREIGN PATENT DOCUMENTS

| JP | 2014-148051 | 8/2014 |
| JP | 2015-178179 | 10/2015 |

(Continued)

*Primary Examiner* — Douglas Q Tran
(74) *Attorney, Agent, or Firm* — Workman Nydegger

(57) ABSTRACT

A server apparatus includes a receiving section that receives first apparatus information and associated information in association with each other, a storage section that stores second apparatus information and user information in association with each other, a control section that determines an execution condition based on the associated information received by the receiving section, and a transmitting section that transmits, to a printing apparatus, the execution condition determined by the control section. The control section causes the execution condition thus determined and the user information associated with the second apparatus information that matches the first apparatus information to be stored in the storage section in association with each other. The transmitting section transmits, to the printing apparatus having the first apparatus information that matches the second apparatus information associated with the user information, the execution condition associated with the user information.

10 Claims, 26 Drawing Sheets

(56) References Cited

U.S. PATENT DOCUMENTS

2020/0371726 A1\* 11/2020 Kato ................. H04N 1/00005
2021/0170772 A1\* 6/2021 Maeda ................ B41J 2/17546

FOREIGN PATENT DOCUMENTS

JP  2018-136736  8/2018
WO 2018-003024  1/2018

\* cited by examiner

SERVER APPARATUS, PRINTING SYSTEM, AND MANAGEMENT METHOD

The present application is based on, and claims priority from JP Application Serial Number 2020-001288, filed Jan. 8, 2020 and JP Application Serial Number 2020-021817, filed Feb. 12, 2020, the disclosures of which are hereby incorporated by reference herein in their entirety.

BACKGROUND

1. Technical Field

The present disclosure relates to a server apparatus, a printing system, and a management method.

2. Related Art

JP-A-2015-178179 discloses a printing system including a printing apparatus having a printing section that prints on a medium and a server apparatus that communicates with the printing apparatus. The printing apparatus executes, based on a predetermined execution condition, a regular cleaning of regularly cleaning the printing section. The server apparatus determines an execution condition for the regular cleaning based on usage of the printing apparatus. The usage includes apparatus information related to the printing apparatus. The apparatus information is information for identifying the printing apparatus. The server apparatus transmits the execution condition thus determined to the printing apparatus.

In the printing system disclosed in JP-A-2015-178179, the server apparatus stores the execution condition thus determined and the apparatus information in association with each other. That is, the server apparatus stores an execution condition for each printing apparatus. In this case, since a different execution condition is determined for each printing apparatus, there are circumstances, for example, under which a user having a plurality of printing apparatuses faces inconvenience.

SUMMARY

According to an aspect of the present disclosure, there is provided a server apparatus that communicates with a printing apparatus having a printing section that prints on a medium, the server apparatus including: a storage section that stores apparatus information and user information in association with each other, the apparatus information being related to the printing apparatus, the user information being related to a user who uses the printing apparatus; a receiving section that receives apparatus information and associated information in association with each other, the apparatus information being transmitted from the printing apparatus, the associated information being transmitted from the printing apparatus and related to a regular cleaning of the printing section; a control section that determines, based on the associated information received by the receiving section, an execution condition for the regular cleaning, the regular cleaning being a cleaning that is regularly executed on the printing section; and a transmitting section that transmits, to the printing apparatus, the execution condition determined by the control section, wherein the apparatus information that is transmitted from the printing apparatus is first apparatus information, the apparatus information that the storage section stores is second apparatus information, the control section causes the execution condition thus determined and the user information associated with the second apparatus information that matches the first apparatus information to be stored in the storage section in association with each other, and the transmitting section transmits, to the printing apparatus having the first apparatus information that matches the second apparatus information associated with the user information, the execution condition associated with the user information.

According to an aspect of the present disclosure, there is provided a printing system including: a printing apparatus; and a server apparatus that communicates with the printing apparatus, wherein the printing apparatus includes a printing section that prints on a medium, a cleaning section that executes a cleaning of the printing section either regularly or in accordance with a user's instruction, a first control section that controls the printing section and the cleaning section, a first transmitting section that transmits apparatus information and associated information in association with each other, the apparatus information being related to the printing apparatus, the associated information being related to a regular cleaning of the printing section, and a first receiving section that receives an execution condition for the regular cleaning, the execution condition being determined by the server apparatus based on the association information and transmitted from the server apparatus, the server apparatus includes a storage section that stores apparatus information and user information in association with each other, the apparatus information being related to the printing apparatus, the user information being related to a user who uses the printing apparatus, a second receiving section that receives the apparatus information and the associated information in association with each other, the apparatus information being transmitted by the first transmitting section, the associated information being transmitted by the first transmitting section, a second control section that determines the execution condition based on the associated information received by the second receiving section, and a second transmitting section that transmits, to the printing apparatus, the execution condition determined by the second control section, the apparatus information that the first transmitting section transmits is first apparatus information, the apparatus information that the storage section stores is second apparatus information, the storage section stores the execution condition and the user information in association with each other, the execution condition being determined by the second control section, the user information being associated with the second apparatus information that matches the first apparatus information received by the second receiving section, and the second transmitting section transmits, to the printing apparatus having the first apparatus information that matches the second apparatus information associated with the user information, the execution condition associated with the user information.

According to an aspect of the present disclosure, there is provided a management method for managing an execution condition for a regular cleaning, the management method including: receiving first apparatus information and associated information in association with each other, the first apparatus information being apparatus information related to a printing apparatus, the associated information being related to the regular cleaning of a printing section of the printing apparatus; determining the execution condition based on the associated information; in a database in which second apparatus information serving as apparatus information related to the printing apparatus and user information related to a user who uses the printing apparatus are held in association with each other, saving the execution condition and the user information in association with each other, the execution condition being determined based on the associated information, the user information being associated with the second apparatus information that matches the first apparatus information; and transmitting, to the printing apparatus having the first apparatus information that matches the second apparatus information associated with the user information, the execution condition associated with the user information.

DESCRIPTION OF EXEMPLARY EMBODIMENTS

First Embodiment

In the following, an embodiment of a printing system including a server apparatus is described with reference to the drawings.

Figure 1:
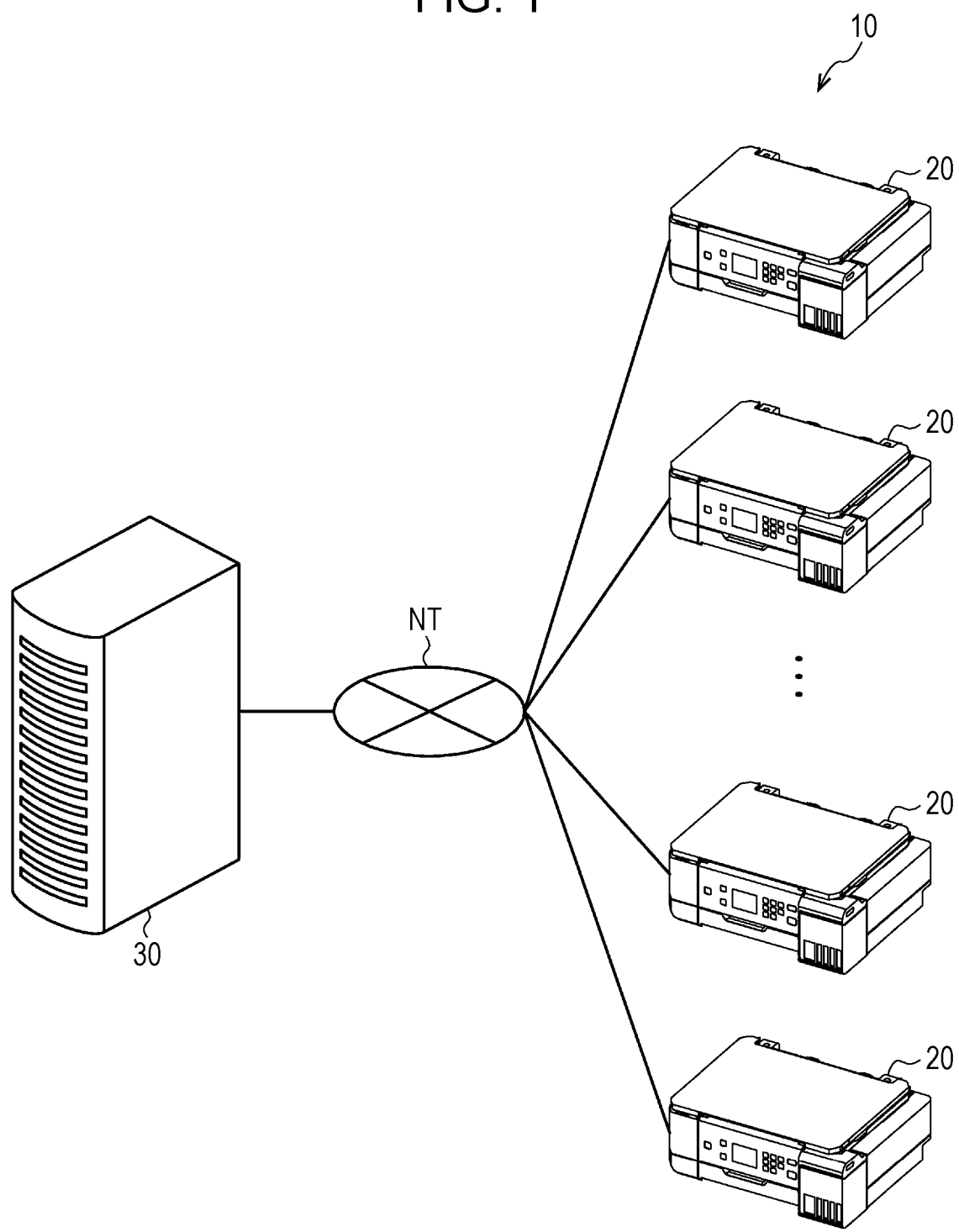
FIG. 1 is a schematic view showing a printing system including printing apparatuses and a server apparatus according to a first embodiment.

As shown in FIG. 1, a printing system 10 includes a printing apparatus 20 and a server apparatus 30. The printing apparatus 20 and the server apparatus 30 communicate with each other via a network NT. In the printing system 10 according to the first embodiment, the server apparatus 30 communicates with a plurality of the printing apparatuses 20. The network NT is a computer network such as a LAN, a WAN, the Internet, or an intranet.

First, the printing apparatus 20 is described. The printing apparatus 20 is an ink-jet printer that prints an image such as a character or a photograph by discharging ink, which is an example of a liquid, onto a medium such as a sheet of paper, a fabric, or a film.

Figure 2:
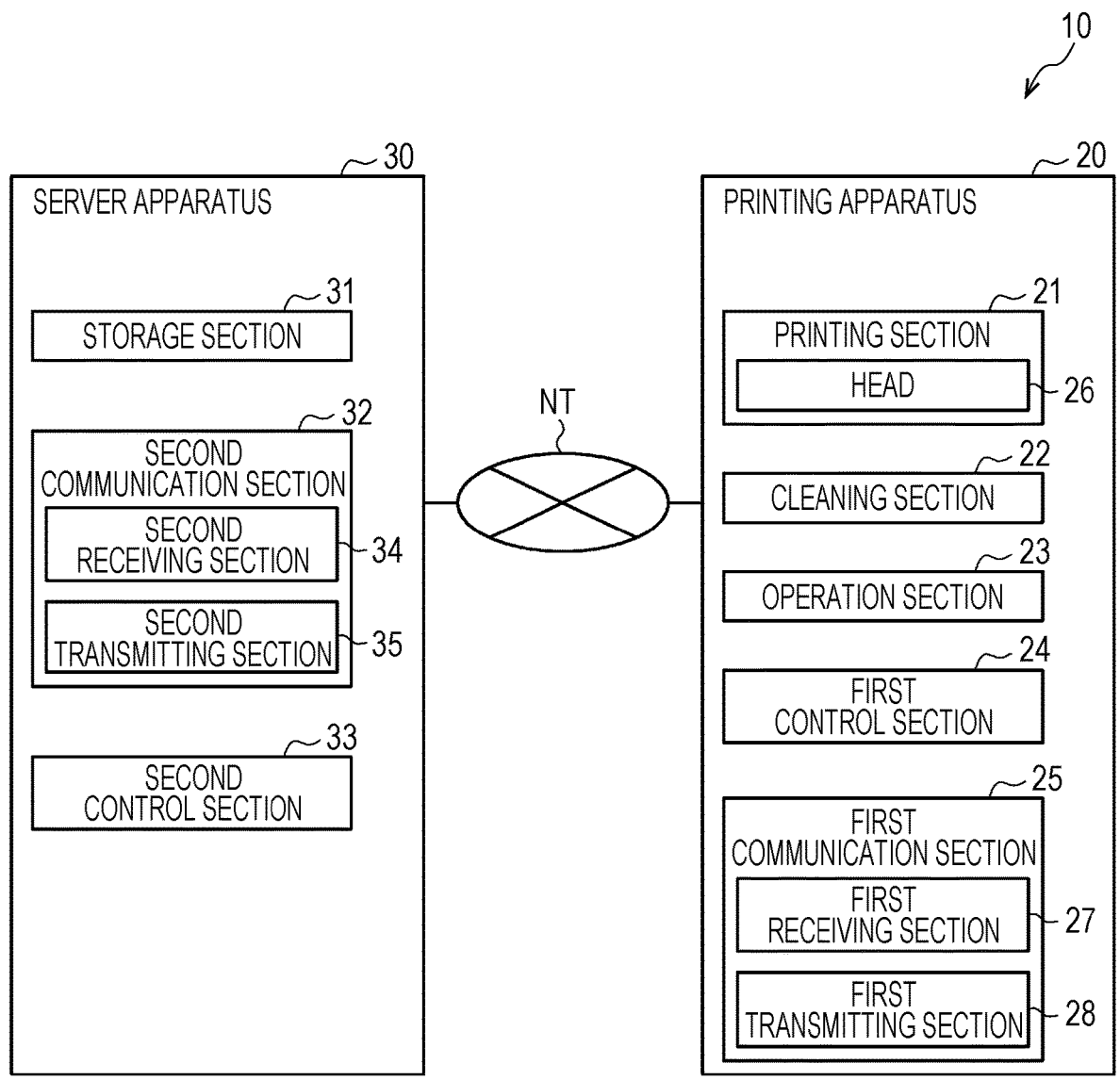
FIG. 2 is a block diagram showing a configuration of a printing apparatus and a configuration of the server apparatus according to the first embodiment.

As shown in FIG. 2, the printing apparatus 20 includes a printing section 21, a cleaning section 22, an operation section 23, a first control section 24, and a first communication section 25.

The printing section 21 is configured to print on a medium. The printing section 21 according to the first embodiment has a head 26 that discharges a liquid onto a medium. The printing section 21 according to the first embodiment prints an image on a medium by the head 26 discharging a liquid onto the medium.

The cleaning section 22 is configured to clean the printing section 21. The cleaning section 22 keeps high printing quality by cleaning the printing section 21. The cleaning section 22 according to the first embodiment cleans the printing section 21 by effecting a forcible discharge of a liquid from the head 26. The cleaning section 22 effects forced drainage of a liquid from the head 26, for example, by subjecting the head 26 to suction or increasing the pressure in the head 26. This effects forced drainage of a liquid thickened in the head 26. As a result, the printing section 21 is cleaned.

The operation section 23 is an interface through which a user operates the printing apparatus 20. The operation section 23 is for example a touch panel, a button, or the like. When the operation section 23 is operated by a user, an instruction corresponding to the operation is inputted to the first control section 24.

The first control section 24 is a control section that the printing apparatus 20 has in the printing system 10. The first control section 24 controls various components of the printing apparatus 20. The first control section 24 for example controls the printing section 21. By controlling the printing section 21, the first control section 24 causes the printing section 21 to print. The first control section 24 according to the first embodiment stores a history of timings at which it caused the printing section 21 to print. The first control section 24 for example controls the cleaning section 22. By controlling the cleaning section 22, the first control section 24 causes the cleaning section 22 to execute a cleaning of the printing section 21.

The first control section 24 may be constituted as a circuit including (α) one or more processors that execute various types of processing according to computer programs, (β) one or more dedicated hardware circuits, such as application specific integrated circuits, that execute at least one or more of the various types of processing, or (γ) a combination thereof. The processors include CPUs and memories such as RAMs and ROMs, and the memories have stored therein program codes or commands configured to cause the CPUs to execute processes. The memories, i.e. computer-readable media, include all readable media that are accessible by general-purpose or dedicated computers.

The first control section 24 stores apparatus information. The apparatus information is information related to the printing apparatus 20. The first control section 24 stores apparatus information related to the printing apparatus 20 to which the first control section 24 belongs. The apparatus information contains unique information that the printing apparatus 20 individually has. That is, the apparatus information contains information for identifying the printing apparatus 20. The apparatus information contains, for example, an identification number, an IP address, and the like that are unique to the printing apparatus 20. The apparatus information needs only contain information that allows identification of one printing apparatus 20 from among the plurality of printing apparatuses 20. In the first embodiment, the apparatus information that the printing apparatus 20 has, i.e. the apparatus information that the first control section 24 stores, is referred to as "first apparatus information".

Upon receiving a cleaning instruction from a user, the first control section 24 causes the cleaning section 22 to execute a cleaning of the printing section 21. A cleaning that is thus executed on the printing section 21 in accordance with every cleaning instruction from a user is herein referred to as "user cleaning". In this respect, the user cleaning is a cleaning that is executed in accordance with a user's instruction.

A cleaning instruction from a user is inputted to the first control section 24, for example, via the operation section 23, a terminal configured to communicate with the printing apparatus 20, or the like. The terminal configured to communicate with the printing apparatus 20 is for example a personal computer, a smartphone, or the like. Upon receiving a cleaning instruction from a user, the first control section 24 stores, as a history, a timing at which it caused the user cleaning to be executed.

When a predetermined execution condition has been satisfied, the first control section 24 causes the cleaning section 22 to execute a cleaning of the printing section 21, separately from a case where a cleaning instruction from a user has been inputted to the first control section 24. That is, a cleaning is executed every time a predetermined execution condition is satisfied. Therefore, in the printing apparatus 20, a cleaning is regularly executed based on a predetermined execution condition, separately from the user cleaning. A cleaning that is thus regularly executed on the printing section 21 based on an execution condition is herein referred to as "regular cleaning". In this way, the cleaning section 22 according to the first embodiment executes a cleaning either regularly or in accordance with a user's instruction.

An execution condition is a condition that serves as a trigger for the execution of the regular cleaning. Examples of execution conditions include a time when the printing apparatus 20 is powered off, a time when the printing section 21 finishes printing, a time when a predetermined amount of media has been consumed. That is, a timing at which the regular cleaning is executed is determined by an execution condition. The first control section 24 has an initial execution condition set in advance therein.

The first communication section 25 is a communication section that the printing apparatus 20 has in the printing system 10. The first communication section 25 is a communication interface for communicating with the server apparatus 30 via the network NT. The first communication section 25 has a first receiving section 27 and a first transmitting section 28.

The first receiving section 27 is a receiving section that the printing apparatus 20 has in the printing system 10. The first receiving section 27 is an interface that receives information from outside the printing apparatus 20 via the network NT. The first receiving section 27 for example receives information from the server apparatus 30. In the first embodiment, the first receiving section 27 receives an execution condition from the server apparatus 30. This matter will be described in detail later.

The first transmitting section 28 is a transmitting section that the printing apparatus 20 has in the printing system 10. The first transmitting section 28 is an interface that transmits information to the outside of the printing apparatus 20 via the network NT. The first transmitting section 28 for example transmits information to the server apparatus 30. In the first embodiment, the first transmitting section 28 transmits the first apparatus information and associated information related to the regular cleaning to the server apparatus 30 in association with each other. It can also be said that apparatus information that is transmitted by the first transmitting section 28 is the first apparatus information. This matter will be described in detail later.

The following describes the server apparatus 30. The server apparatus 30 includes a storage section 31, a second communication section 32, and a second control section 33.

The storage section 31 is for example a storage such as a hard disk or a flash memory. The storage section 31 stores user information and apparatus information. Specifically, the storage section 31 stores user information and apparatus information in association with each other. That is, user information and apparatus information are stored in the storage section 31 in association with each other. In the first embodiment, the storage section 31 has stored therein a database holding plural pieces of user information associated with apparatus information.

User information is information related to a user who uses the printing apparatus 20. That is, a user indicated by user information is a user of the printing apparatus 20. In the first embodiment, the user of the printing apparatus 20 is an owner of the printing apparatus 20. In the first embodiment, the printing apparatus 20 is used by one user.

User information is user-specific information. For example, user information contains a user ID. User information needs only contain information that allows identification of one user from among a plurality of users.

As mentioned above, apparatus information is information related to the printing apparatus 20. Apparatus information that the storage section 31 stores is associated with one piece of user information. Apparatus information that the storage section 31 stores is associated with user information related to a user who uses the printing apparatus 20 that the apparatus information indicates. That is, user information and apparatus information that are associated with each other indicate a relationship between a printing apparatus 20 and a user who uses the printing apparatus 20. In the first embodiment, apparatus information that the server apparatus 30 has, i.e. apparatus information that the storage section 31 stores, is referred to as "second apparatus information". The second apparatus information is information that is similar to the first apparatus information.

TABLE 1

| User information | Second apparatus information | Execution condition |
| --- | --- | --- |
| User information A | Second apparatus information A<br>Second apparatus information B<br>Second apparatus information C | Execution condition A |
| User information B | Second apparatus information D<br>Second apparatus information E | Execution condition B |
| User information C | Second apparatus information F | Execution condition C |
| ... | ... | ... |

Table 1 shows an example of the database that the storage section 31 records. As shown in Table 1, the database holds second apparatus information and user information in association with each other. In the database, user information is associated with one or more pieces of second apparatus information. That is, user information is associated with one or more pieces of apparatus information. User information is associated with one execution condition.

The user information A is information related to a user A. The user information B is information related to a user B. The user information C is information related to a user C.

The second apparatus information A is information related to a printing apparatus A. The second apparatus information A is associated with the user information A. The second apparatus information B is information related to a printing apparatus B. The second apparatus information B is associated with the user information A. The second apparatus information C is information related to a printing apparatus C. The second apparatus information C is associated with the user information A. The second apparatus information D is information related to a printing apparatus D. The second apparatus information D is associated with the user information B. The second apparatus information E is information related to a printing apparatus E. The second apparatus information E is associated with the user information B. The second apparatus information F is information related to a printing apparatus F. The second apparatus information F is associated with the user information C.

The execution condition A is associated with the user information A. The execution condition B is associated with the user information B. The execution condition C is associated with the user information C.

Since second apparatus information is associated with user information, reference to the database makes it possible to identify which printing apparatus 20 one user is using. For example, reference to the database makes it possible to grasp that the user A is using the printing apparatus A, the printing apparatus B, and the printing apparatus C. Reference to the database makes it possible to grasp that the user B is using the printing apparatus D and the printing apparatus E. Reference to the database makes it possible to grasp that the user C is using the printing apparatus F.

User information and apparatus information are stored in the storage section 31 in association with each other, for example, by a user registering him/herself as a user of a printing apparatus 20. That is, user registration is registration for associating a printing apparatus 20 with a user who uses the printing apparatus 20.

The user registration is executed, for example, by inputting, into a predetermined platform, information related to the user and information related to the printing apparatus 20. In this case, the user may access the predetermined platform from the printing apparatus 20 or may access the predetermined platform from a terminal such as a smartphone or a personal computer. That is, the user registration may be executed via the operation section 23 or may be executed from a terminal such as a personal computer or a smartphone via the network NT. The user registration may be executed by an administrator of the server apparatus 30 instead of the user.

In a system called subscription in which an amount of money is paid according to a period of time during which the printing system 10 is utilized, a relationship between a printing apparatus 20 and a user who uses the printing apparatus 20 is managed by the server apparatus 30. That is, the server apparatus 30 stores user information and apparatus information in association with each other. Therefore, the first embodiment can also be applied to subscription.

As shown in FIG. 2, the second communication section 32 is a communication section that the server apparatus 30 has in the printing system 10. The second communication section 32 is a communication interface for communicating with the printing apparatus 20 via the network NT. The second communication section 32 has a second receiving section 34 and a second transmitting section 35.

The second receiving section 34 is a receiving section that the server 30 has in the printing system 10. The second receiving section 34 is an interface that receives information from outside the server apparatus 30 via the network NT. The second receiving section 34 for example receives information from one or more printing apparatuses 20. The second receiving section 34 according to the first embodiment receives first apparatus information transmitted by the first transmitting section 28 and associated information transmitted by the first transmitting section 28 in association with each other. This matter will be described later.

The second transmitting section 35 is a transmitting section that the server apparatus 30 has in the printing system 10. The second transmitting section 35 is an interface that transmits information to the outside of the server apparatus 30 via the network NT. The second transmitting section 35 for example transmits information to one or more printing apparatuses 20. The second transmitting section 35 according to the first embodiment transmits, to the printing apparatus 20, an execution condition determined by the server apparatus 30. This matter will be described later.

The second control section 33 is a control section that the server apparatus 30 has in the printing system 10. The second control section 33 may be constituted as a circuit including (α) one or more processors that execute various types of processing according to computer programs, (β) one or more dedicated hardware circuits, such as application specific integrated circuits, that execute at least one or more of the various types of processing, or (γ) a combination thereof. The processors include CPUs and memories such as RAMs and ROMs, and the memories have stored therein program codes or commands configured to cause the CPUs to execute processes. The memories, i.e. computer-readable media, include all readable media that are accessible by general-purpose or dedicated computers.

The second control section 33 determines an execution condition based on associated information serving as information related to the regular cleaning. The associated information is information that a printing apparatus 20 has. The associated information is transmitted from the printing apparatus 20 to the server apparatus 30, i.e. from the first transmitting section 28 to the second receiving section 34.

In the first embodiment, the associated information contains request information, an execution history, and a printing frequency. The associated information is information to which the second control section 33 refers in determining an execution condition for the regular cleaning. In this respect, the associated information can be said to be information related to the regular cleaning. The associated information may contain information other than the request information, the execution history, and the printing frequency.

The request information is information related to a request from a user regarding the regular cleaning. That is, the request information is information related to an execution condition for the regular cleaning that the user demands. The request information contains, for example, information related to at least one of an execution timing, an execution frequency, and an execution time of the regular cleaning. The request information may contain other information such as an intensity, a type, or the like of the regular cleaning.

The execution timing indicates a timing at which to execute the regular cleaning. For example, when an execution condition under which to execute the regular cleaning is set to a time when the printing apparatus 20 is powered on, the execution timing is a time when the printing apparatus 20 is powered on. In the first embodiment, the execution timing is a timing based on the operation of the printing apparatus 20.

In the first embodiment, it is possible to set at least one of a first timing and a second timing as the execution timing of the regular cleaning. In this case, the execution timing that the request information contains include at least one of the first timing and the second timing. The execution timing that the request information contains may include at least one of the first timing, the second timing, a third timing, and a fourth timing. The execution timing that the request information contains may include other timings as well as the first timing, the second timing, the third timing, and the fourth timing.

The first timing is a timing from a time when the printing apparatus 20 is powered on to a time when the printing section 21 starts printing on a medium. For example, when the user would like to configure the settings so that the regular cleaning is executed at a time when the printing apparatus 20 is powered on, the request information contains information related to the execution timing of the regular cleaning. In this case, the execution timing that the request information contains is the first timing. For example, when the user would like to configure the settings so that the regular cleaning is executed during startup operation of the printing apparatus 20 or immediately after the end of the startup operation, the request information contains information related to the execution timing of the regular cleaning. In this case, the execution timing that the request information contains is the first timing. The startup operation is a boot-up operation that is executed at a time when the printing apparatus 20 is powered on.

The second timing is a timing at which the printing apparatus 20 is powered off. For example, when the user would like to configure the settings so that the regular cleaning is executed at a time when the printing apparatus 20 is powered off, the request information contains information related to the execution timing of the regular cleaning. In this case, the execution timing that the request information contains is the second timing. For example, when the user would like to configure the settings so that the regular cleaning is executed during shutdown operation of the printing apparatus 20 or immediately after the end of the shutdown operation, the request information contains information related to the execution timing of the regular cleaning. In this case, the execution timing that the request information contains is the second timing. The shutdown operation is an exit operation that is executed at a time when the printing apparatus 20 is powered off.

The third timing is a timing at which the printing apparatus 20 shifts to a power-saving mode. For example, when printing is not executed over a predetermined period of time, the printing apparatus 20 shifts to a power-saving mode in which the printing apparatus 20 consumes less electric power. After having shifted to the power-saving mode, the printing apparatus 20 reduces power consumption, for example, by reducing the amount of communication that the printing apparatus 20 performs with various components. For example, when the user would like to configure the settings so that the regular cleaning is executed during a shift to the power-saving mode, the request information contains information related to the execution timing of the regular cleaning. In this case, the execution timing that the request information contains is the third timing. For example, when the user would like to configure the settings so that the regular cleaning is executed immediately before the printing apparatus 20 shifts to the power-saving mode, while the printing apparatus 20 is shifting to the power-saving mode, or immediately after the printing apparatus 20 has shifted to the power-saving mode, the request information contains information related to the execution timing of the regular cleaning. In this case, the execution timing that the request information contains is the third timing.

The fourth timing is a timing at which a predetermined period of time has elapsed since the printing apparatus 20 shifted to the power-saving mode. For example, when the user would like to configure the settings so that the regular cleaning is executed at a time when a predetermined period of time has elapsed since a shift to the power-saving mode, the request information contains information related to the execution timing of the regular cleaning. In this case, the execution timing that the request information contains is the fourth timing.

The execution frequency indicates a frequency with which the regular cleaning is executed. For example, when the user would like to configure the settings so that the regular cleaning is executed every hour, the request information contains information related to the execution frequency of the regular cleaning. In this case, the execution frequency that the request information contains is once per hour.

The execution time indicates a point of time at which the regular cleaning is executed. For example, when the user would like to configure the settings so that the regular cleaning is executed at 15 o'clock, the request information contains information related to the execution time of the regular cleaning. In this case, the execution time that the request information contains is 15 o'clock.

The second control section 33 determines an execution condition in line with the request information, for example, based on the request information. For example, when the execution timing that the request information contains is the first timing, the second control section 33 determines an execution condition under to execute the regular cleaning at a time when the printing apparatus 20 is powered on. For example, when the execution time that the request information contains is 15 o'clock, the second control section 33 determines an execution condition under which to execute the regular cleaning at 15 o'clock. By analyzing the request information, the second control section 33 may determine an execution condition that is optimum for the user.

The execution history is a history of user cleanings executed. For example, the second control section 33 determines, based on the execution history, an execution condition under which to execute the regular cleaning at a timing at which a frequency with which the user cleaning is executed is high. For example, when the frequency with which the user cleaning is executed at the first timing exceeds a predetermined threshold, the second control section 33 determines, based on the execution history, an execution condition under which to execute the regular cleaning at a time when the printing apparatus 20 is powered on. For example, when the proportion of user cleanings that are executed at first timings exceeds 50% in the execution history, the second control section 33 determines, based on the execution history, an execution condition under which to execute the regular cleaning at a time when the printing apparatus 20 is powered on. When the frequency with which the user cleaning is executed at the second timing is high, the second control section 33 may determine an execution condition under which to execute the regular cleaning at a time when the printing apparatus 20 is powered off.

The printing frequency is a frequency with which the printing section 21 prints. The printing frequency is for example the number of prints per unit time. The second control section 33 for example calculates a printing frequency for each time period from a history of prints that the printing section 21 made. For example, the second control section 33 determines, based on the printing frequency, an execution condition under which to execute the regular cleaning in a time period during which the printing frequency is lower than in a time period during which the printing frequency is highest. For example, when the printing frequency is highest during the time period from 12 o'clock to 15 o'clock, the second control section 33 determines an execution condition under which to execute the regular cleaning in a time period other than the time period from 12 o'clock to 15 o'clock. For example, when the printing frequency is highest during a time period from a time when the printing apparatus 20 is powered on to passage of one hour, the second control section 33 determines an execution condition under which to execute the regular cleaning in a time period after passage of one hour from a time when the printing apparatus 20 was powered on. The printing frequency for each time period that the second control section 33 calculates may for example be a frequency of printing every hour, a frequency of printing every two hours, or a frequency of printing every three hours.

As described above, the second control section 33 according to the first embodiment determines an execution condition based on associated information such as request information, an execution history, and a printing frequency. The second control section 33 may determine an execution condition based on information other than the request information, the execution history, and the printing frequency.

The following describes how the server apparatus 30 operates.

First, a first process that the second control section 33 executes is described. When the second receiving section 34 receives associated information and first apparatus information that are associated with each other, the second control section 33 executes the first process. In the first embodiment, the associated information and the first apparatus information that are associated with each other are referred to as "first information". That is, the first information is associated information and apparatus information that are associated with each other. The first information may be transmitted from the printing apparatus 20 to the server apparatus 30 when the printing apparatus 20 comes to a predetermined timing or may be transmitted from the printing apparatus 20 to the server apparatus 30 when the server apparatus 30 has requested the printing apparatus 20 for the first information. That is, the printing apparatus 20 may actively transmit the first information to the server apparatus 30, or the printing apparatus 20 may passively transmit the first information to the server apparatus 30 based on a request from the server apparatus 30. At this point in time, the first transmitting section 28 transmits the first information, and the second receiving section 34 receives the first information.

Figure 3:
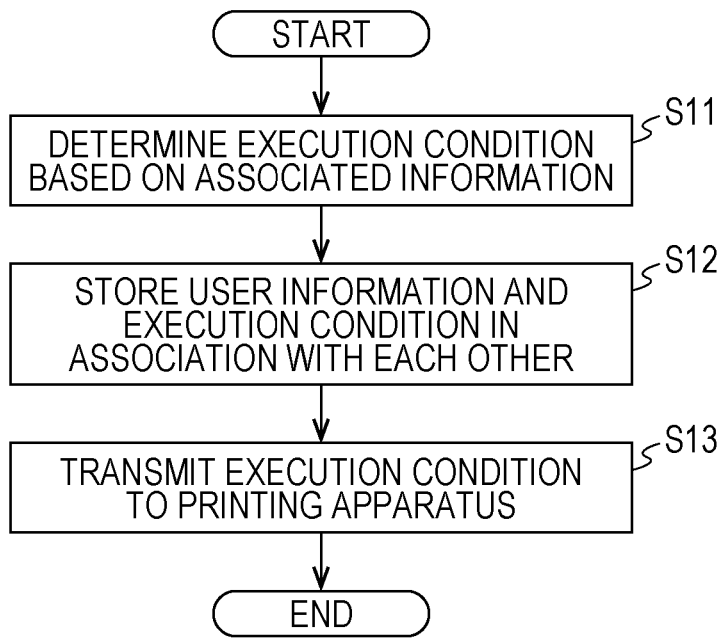
FIG. 3 is a flow chart showing an example of a first process that the server apparatus according to the first embodiment executes.

As shown in FIG. 3, first, in step S11, the second control section 33, which executes the first process, determines an execution condition based on the associated information contained in the first information.

In step S12, the second control section 33 stores user information and the execution condition in the storage unit 31 in association with each other. At this point in time, the second control section 33 collates the first apparatus information contained in the first information with the second apparatus information stored in the storage section 31. The second control section 33 associates, with the execution condition, user information associated with second apparatus information that matches the first information contained in the first information. As a result, the execution condition determined in step S11 is stored in the storage section 31 in association with the user information. In the first embodiment, the execution condition is saved in the database in association with the user information.

In step S13, the second control section 33 transmits the execution condition stored in the storage section 31 to the printing apparatus 20 via the second transmitting section 35. At this point in time, the second transmitting section 35 transmits, to the printing apparatus 20 having the first apparatus information that matches the second apparatus information associated with the user information, the execution condition associated with the user information in step S12. The second control section 33 ends the first process upon finishing step S13.

In this way, the server apparatus 30 manages execution conditions after having determined them. That is, a management method for managing an execution condition for a regular cleaning includes: receiving first apparatus information and associated information in association with each other, the first apparatus information being apparatus information related to a printing apparatus 20, the associated information being related to the regular cleaning of a printing section 21 of the printing apparatus 20; determining the execution condition based on the associated information; in a database in which user information related to a user and second apparatus information serving as apparatus information related to the printing apparatus 20 are held in association with each other, saving the execution condition and the user information in association with each other, the execution condition being determined based on the associated information, the user information being associated with the second apparatus information that matches the first apparatus information associated with the associated information; and transmitting, to the printing apparatus 20 having the first apparatus information that matches the second apparatus information associated with the user information, the execution condition associated with the user information.

The following describes a second process that the second control section 33 executes. The second process is a process that is executed when second apparatus information associated with user information has been updated. Updating of second apparatus information takes place, for example, when a user replaces the printing apparatus 20 with a new one. In this case, the second apparatus information associated with the user information is updated to second apparatus information related to the new printing apparatus 20. In particular, the second apparatus information associated with the user information is updated to second apparatus information that is different from the second apparatus information. Upon updating of second apparatus information held in the database, the second control section 33 executes the second process. At this point in time, the second control section 33 receives update information indicating that the second apparatus information has been updated. That is, the second control section 33 executes the second process upon receiving the update information.

Figure 4:
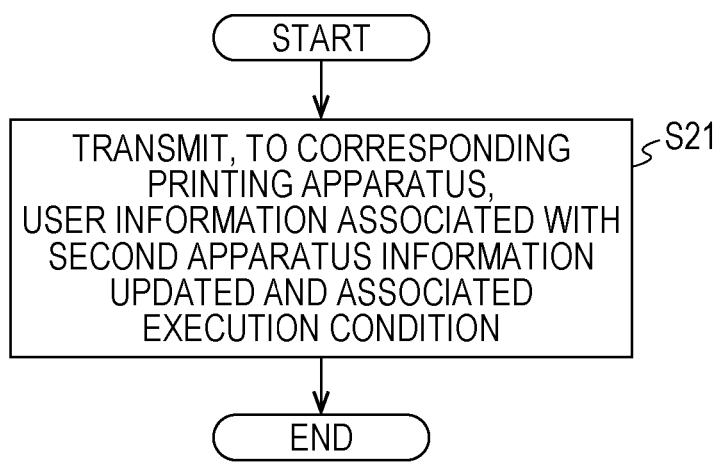
FIG. 4 is a flow chart showing an example of a second process that the server apparatus according to the first embodiment executes.

As shown in FIG. 4, in step S21, the second control section 33, which executes the second process, transmits, to a corresponding printing apparatus 20 via the second transmitting section 35, an execution condition associated with user information associated with updated second apparatus information. At this point in time, the second transmitting section 35 transmits, to a printing apparatus 20 having first information that matches the updated second apparatus information, the execution condition associated with the user information associated with the updated second apparatus information. Thus, the execution condition is associated with the user information; therefore, even when a user has replaced the printing apparatus 20 with a new one, the execution condition can be carried on into the new printing apparatus 20. The second control section 33 ends the second process upon finishing step S21.

The following describes a third process that the second control section 33 executes. The third process is a process that is executed when second apparatus information associated with user information is added. Addition of second apparatus information takes place, for example, when a user buys an additional printing apparatus 20. In this case, there is an increase in the number of pieces of second apparatus information associated with the user information. In particular, with user information with which second apparatus information has been associated, second apparatus information that is different from the second apparatus information is additionally associated. Upon addition of second apparatus information to the database, the second control section 33 executes the third process. At this point in time, the second control section 33 receives additional information indicating that the second apparatus information has been added. That is, the second control section 33 executes the third process upon receiving the additional information.

Figure 5:
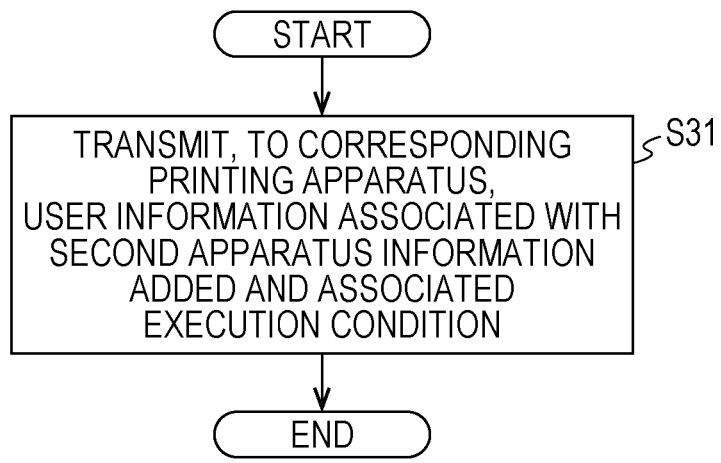
FIG. 5 is a flow chart showing an example of a third process that the server apparatus according to the first embodiment executes.

As shown in FIG. 5, in step S31, the second control section 33, which executes the third process, transmits, to a corresponding printing apparatus 20, an execution condition associated with user information associated with added second apparatus information. At this point in time, the second transmitting section 35 transmits, to a printing apparatus 20 having first apparatus information that matches the added second apparatus information, the execution condition associated with the user information associated with the added second apparatus information. Thus, the execution condition is associated with the user information; therefore, even when a user buys an additional printing apparatus 20, the execution condition can be carried on into the new printing apparatus 20. The second control section 33 ends the third process upon finishing step S31.

The following describes how a printing apparatus 20 operates.

A fourth process that the first control section 24 executes is described. The fourth process is a process that is executed when the first receiving section 27 has received an execution condition transmitted from the server apparatus 30.

Figure 6:
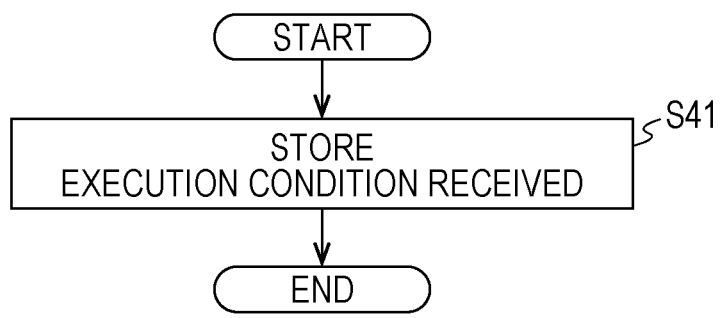
FIG. 6 is a flow chart showing an example of a fourth process that the server apparatus according to the first embodiment executes.

As shown in FIG. 6, in step S41, the first control section 24 stores an execution condition received by the first receiving section 27. The first control section 24 ends the fourth process upon finishing step S41.

A user who uses the printing apparatus 20 may set an execution condition determined by the server apparatus 30 or may set other execution conditions. For example, with permission from the user, the first control section 24 sets the execution condition determined by the server apparatus 30. This allows the user to or not to reflect, in the printing apparatus 20, the execution condition determined by the server apparatus 30.

The following describes the workings and effects of the first embodiment described above.

(1) An execution condition is stored in the storage section 31 in association with user information, and is transmitted to a printing apparatus 20 having first apparatus information that matches second apparatus information associated with the user information. Therefore, for example, when a user has a plurality of printing apparatuses 20, i.e. when a plurality of pieces of second apparatus information are associated with the user information, one execution condition can be reflected in the plurality of printing apparatuses 20. This brings about improvement in user friendliness.

(2) Association information contains request information. The request information contains information related at least one of an execution timing, an execution frequency, and an execution time of a regular cleaning. In this case, the second control section 33 determines an execution condition based on the request information. Therefore, the second control section 33 can determine an execution condition suited to the user's request.

(3) The request information contains information related to the execution timing. The execution timing includes at least one of a first timing from a time when the printing apparatus 20 is powered on to a time when the printing section 21 starts printing on a medium and a second timing at which the printing apparatus 20 is powered off. In this case, the second control section 33 determines an execution condition based on the execution timing including at least one of the first timing and the second timing. Therefore, the second control section 33 can determine an execution condition suited to the execution timing for which the user requests.

(4) The associated information contains an execution history of a user cleaning that is the cleaning that is executed in accordance with a user's instruction. In this case, the second control section 33 can determine an execution condition based on the execution history of the user cleaning.

(5) When, in the execution history, the frequency with which the user cleaning is executed at the first timing exceeds a predetermined threshold, the second control section 33 determines, based on the execution history, an execution condition under which to execute the regular cleaning at a time when the printing apparatus 20 is powered on. In this case, for example, in the case of a user who has a habit of executing the user cleaning at a time when the printing apparatus 20 is powered on, an execution condition under which to execute the regular cleaning at a time when the printing apparatus 20 is powered on is determined. That is, an execution condition suited to the user's request is determined. This brings about improvement in usability.

(6) The associated information contains a printing frequency of the printing section 21. The second control section 33 determines, based on the printing frequency, an execution condition under which to execute the regular cleaning in a time period during which the printing frequency is lower than in a time period during which the printing frequency is highest. In this case, the execution of the regular cleaning in a time period during which the printing frequency is lower leads to a reduction in downtime of the printing apparatus 20 by the regular cleaning.

(7) When second apparatus information associated with user information has been updated to second apparatus information that is different from the second apparatus information, the second transmitting section 35 transmits, to a printing apparatus 20 having first apparatus information that matches the second apparatus information thus updated, an execution condition associated with the user information associated with the second apparatus information thus updated. In this case, for example, when the user has replaced the printing apparatus 20 with a new one, the execution condition can be carried on into the new printing apparatus 20. This allows the user to reflect, in the new printing apparatus 20, an execution condition set in the hitherto-used printing apparatus 20. This brings about improvement in usability.

(8) When, with the user information associated with the second apparatus information, second apparatus information that is different from the second apparatus information has been additionally associated, the second transmitting section 35 transmits, to a printing apparatus 20 having first apparatus information that matches the second apparatus information thus added, the execution condition associated with the user information associated with the second apparatus information thus added. In this case, for example, when the user has additionally bought a new printing apparatus 20, the user can reflect the execution condition in the new printing apparatus 20. This allows the user to reflect, in the new printing apparatus 20, an execution condition set in the hitherto-used printing apparatus 20. This brings about improvement in usability.

The first embodiment can be implemented as the following modifications. The first embodiment and the following modifications can be carried out in combination with each other as long as no technical contradiction arises.

An execution condition determined by the server apparatus 30 may be automatically set by the printing apparatus 20. For example, the printing apparatus 20 may automatically set an execution condition received from the server apparatus 30.

A plurality of execution conditions may be associated with one piece of user information. In this case, the second control section 33 causes a plurality of execution conditions to be stored in the storage section 31 in association with one piece of user information. This allows the user to set any execution condition in a plurality of printing apparatuses 20 from among a plurality of execution conditions determined by the server apparatus 30.

The second control section 33 may cause the associated information received by the second receiving section 34 to be stored in the storage section 31 in association with the second apparatus information.

The database stored in a state where the user information and the second apparatus information are associated with each other may be stored in a component that is different from the server apparatus 30. For example, a server apparatus that is different from the server apparatus 30, which determines an execution condition, may have the database stored therein.

The printing apparatus 20 is not limited to an ink-jet printer, but may be a laser printer, a thermal printer, or the like.

The liquid that the head 26 discharges is not limited to ink, but may be a liquid body obtained, for example, by dispersing or mixing particles of a functional material into a liquid. For example, the head 26 may discharge a liquid body containing a dispersion or dissolution of a material, such as an electrode material or a pixel material, that is used, for example, in the manufacture of a liquid crystal display, an electroluminescence display, and a surface-emitting display.

Second Embodiment

In the following, a server apparatus and a printing system according to the second embodiment are described with reference to the drawings. A printing apparatus that the printing system according to the second embodiment includes is an ink-jet printer that prints a character, an image, or the like by discharging ink, which is an example of a printing material, onto a medium such as a sheet of paper.

Figure 7:
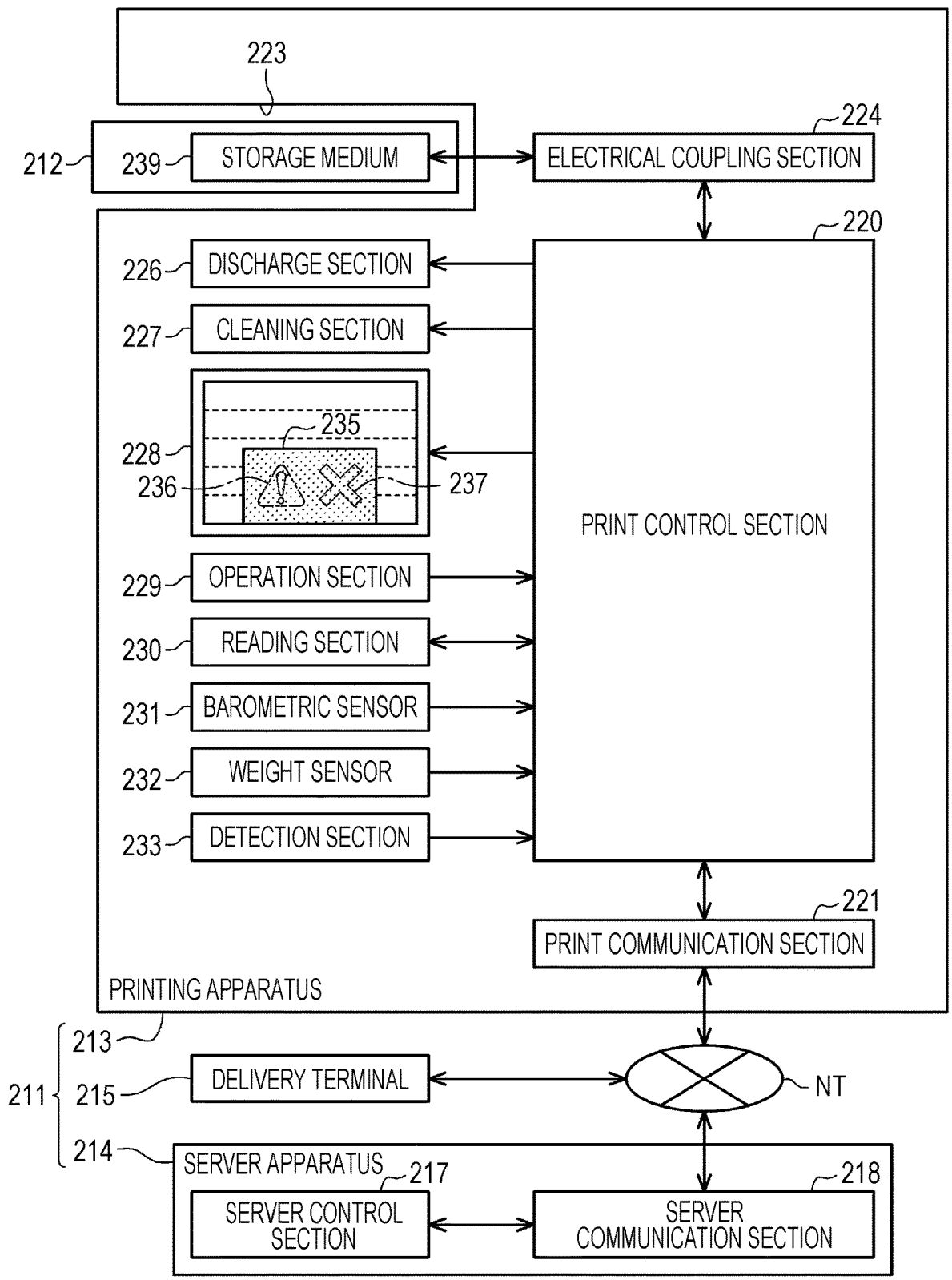
FIG. 7 is a block diagram showing a printing system according to a second embodiment.

As shown in FIG. 7, a printing system 211 includes a printing apparatus 213 that performs printing with a printing material that is supplied from a printing material container 212 containing the printing material and a server apparatus 214 configured to communicate with the printing apparatus 213. The printing system 211 may include a delivery terminal 215 that prompts a worker to arrange the delivery of a printing material container 212. The server apparatus 214 is communicably connected to the printing apparatus 213 and the delivery terminal 215 via a network NT. The printing system 211 may include a plurality of the printing apparatuses 213 connected to one server apparatus 214. The printing system 211 may include a plurality of the delivery terminals 215 connected to one server apparatus 214.

The server apparatus 214 includes a server control section 217 and a server communication section 218. The server control section 217 is constituted, for example, by a computer, a processing circuit including a memory, or other components, and executes various types of processing in accordance with programs stored in the memory.

The printing apparatus 213 includes a print control section 220, which is an example of the control section, and a print communication section 221. The print control section 220 is constituted, for example, by a computer, a processing circuit including a memory, or other components, and executes various types of processing that are executed in the printing apparatus 213 in accordance with programs stored in the memory.

The printing apparatus 213 may include an mounting portion 223 into which a printing material container 212 is inserted and an electrical coupling section 224 that is electrically coupled to a printing material container 212 inserted into the mounting portion 223. The printing apparatus 213 may include a plurality of the mounting portions 223. The printing apparatus 213 may render a plurality of the printing material containers 212 insertable into one mounting portion 223. One printing material container 212 may contain one type of printing material or may contain a plurality of types of printing material. The printing apparatus 213 may perform color printing with a plurality of colors of printing material that are supplied from one printing material container 212 or a plurality of the printing material containers 212. The printing apparatus 213 according to the second embodiment includes one mounting portion 223 and performs monochromatic printing by causing one color of printing material that is supplied from one printing material container 212 to adhere to a medium.

The printing apparatus 213 may include a discharge section 226 that prints on a medium by discharging a liquid printing material that is supplied from the printing material container 212 and a cleaning section 227 that performs a cleaning of the discharge section 226 by draining the printing material from the discharge section 226. The printing apparatus 213 may include a display section 228 that displays information related to the printing apparatus 213 and the printing material container 212 and an operation section 229 for carrying out an operation of the printing apparatus 213. The printing apparatus 213 may include a reading section 230 that reads an image printed on a medium, a barometric sensor 231 that measures the atmospheric pressure of a place in which the printing apparatus 213 is installed, a weight sensor 232 that measures the weight of the printing material container 212, and a detection section 233 that detects a state of the printing material container 212. When a plurality of the printing material containers 212 are insertable into the printing apparatus 213, a plurality of the weight sensors 232, a plurality of the detection sections 233, and a plurality of the electrical coupling sections 224 are provided separately in correspondence with each of the printing material containers 212.

The display section 228 according to the second embodiment is a screen. The print control section 220 may display, on the display section 228, the remaining amount of a printing material contained in the printing material container 212. For example, the print control section 220 may use a data marker 235 to indicate the proportion of the remaining amount to an initial amount that is the amount of a printing material that an unused printing material container 212 contains. The print control section 220 may display, on the display section 228, an advance notice mark 236 that indicates the approach of a time for replacement of the printing material container 212 and a replacement mark 237 that indicates the need to replace the printing material container 212. The display section 228 may be a lamp that glows, blinks, or changes its color according to a state of the printing apparatus 213. The operation section 229 may be a button or may be a touch pad. The display section 228 and the operation section 229 may be integrally constituted by a touch panel.

The detection section 233 is configured to detect that the amount of a printing material that the printing material container 212 contains reaches an advance notice threshold that is higher than a necessary threshold at which the printing material container 212 needs to be replaced and the printing material container 212 is in a de-minimis state. The term "de-minimis state" refers to a state also called "near end". The advance notice threshold is a value that serves as a yardstick for indicating to a user the approach of a time for replacement of the printing material container 212. The print control section 220 may cause the display section 228 to display the advance notice mark 236 when the detection section 233 has detected a de-minimis state. The print control section 220 may cause the display section 228 to display the replacement mark 237 when the detection unit 233 has detected a de-minimis state and then determined that a predetermined amount of printing material has been consumed and the remaining amount has reached the necessary threshold. A usable example of the detection unit 233 is a reflective optical sensor, a transmissive optical sensor, an electrode pin, a capacitive sensor, or the like.

The printing material container 212 may include a storage medium 239 that stores information related to the printing material container 212. The storage medium 239 is for example an IC chip. Upon insertion of the printing material container 212 into the mounting portion 223, the storage medium 239 becomes able to communicate with the print control section 220 via the electrical coupling section 224. The coupling of the electrical coupling section 224 to the storage medium 239 allows the print control section 220 to read out information stored in the storage medium 239 or write information to the storage medium 239. The electrical coupling section 224 may be a connector that enables communication upon contact with the storage medium 239 or a wireless device that wirelessly reads and writes information from and to the storage medium 239.

The storage medium 239 stores initial amount information related to the initial amount of the printing material container 212 and remaining amount information related to the remaining amount. The storage medium 239 according to the second embodiment stores, as the initial amount information, the mass of the initial amount of the printing material container 212, and stores, as the remaining amount information, the mass of the remaining amount of the printing material container 212. When the printing material container 212 is unused, the initial amount information and the remaining amount information match. The initial amount information and the remaining amount information may for example be the number of liquid droplets that the discharge section 226 is configured to discharge with the initial amount or remaining amount of printing material or the number of cleanings that the cleaning section 227 is configured to execute.

Next, an insertion routine that the print control section 220 executes is described with reference to a flow chart shown in FIG. 8. The print control section 220 executes the insertion routine at the timing of insertion of a printing material container 212 into the mounting portion 223.

Figure 8:
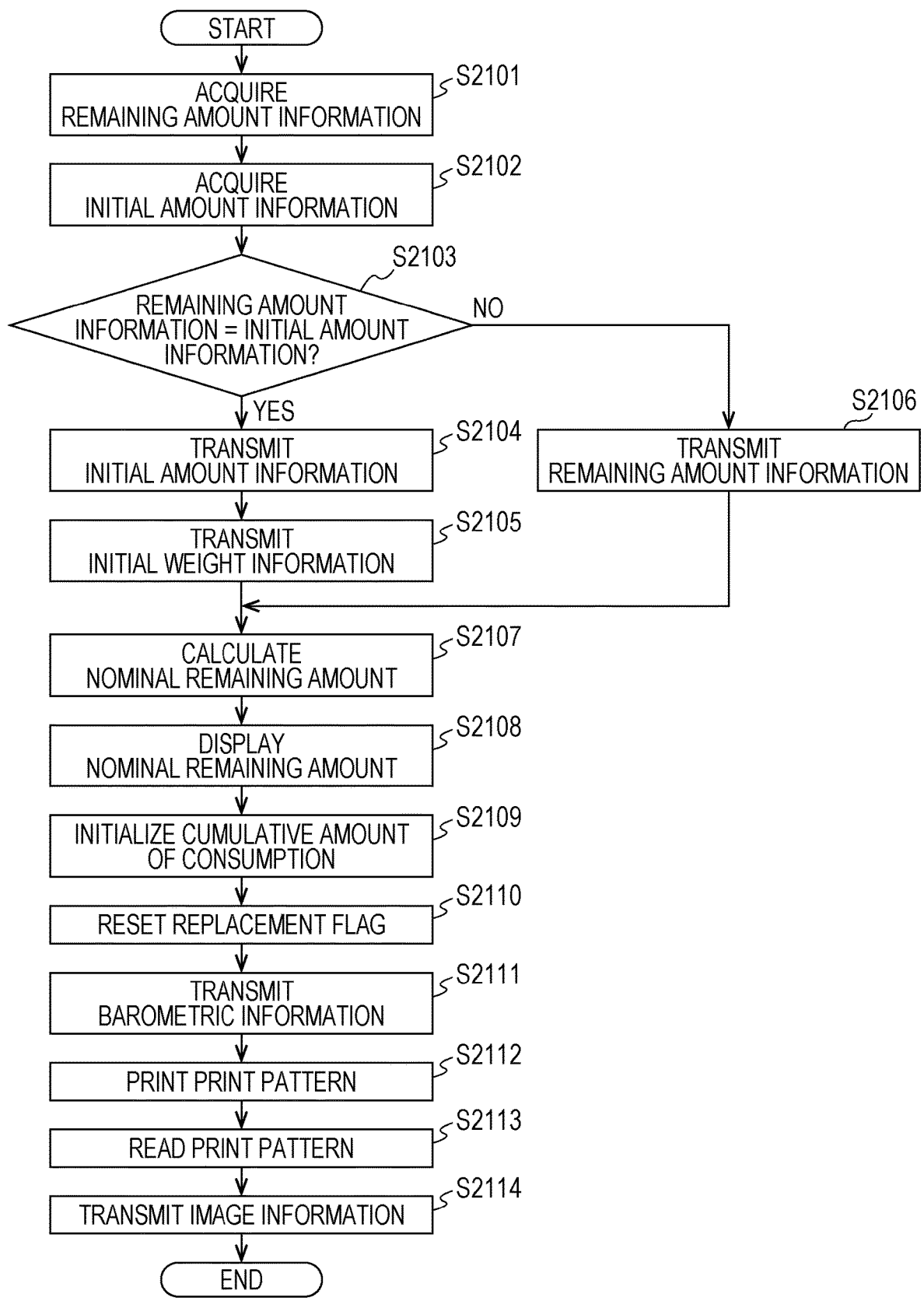
FIG. 8 is a flow chart showing an insertion routine that a print control section according to the second embodiment executes.

As shown in FIG. 8, in step S2101, the print control section 220 acquires the remaining amount information from the storage medium 239. In step S2102, the print control section 220 acquires the initial amount information from the storage medium 239. In step S2103, the print control section 220 determines whether the remaining amount information and the initial amount information match.

When the printing material container 212 is unused, the remaining amount information and the initial amount information match (YES in step S2103), and the print control section 220 proceeds to step S2104. In step S2104, the print control section 220 transmits the initial amount information to the server apparatus 214. In step S2105, the print control section 220 transmits initial weight information to the server apparatus 214. The initial weight information is an example of weight information related to the weight of the printing material container 212 as measured by the weight sensor 232.

When the remaining amount information and the initial amount information do not match (NO in step S2103), the print control section 220 proceeds to step S2106. In step S2106, the print control section 220 transmits the remaining amount information to the server apparatus 214.

In step S2107, the print control section 220 calculates a nominal remaining amount from the remaining amount information and the initial amount information. The nominal remaining amount is the proportion of the remaining amount to the initial amount (Nominal remaining amount=Remaining amount/Initial amount×100 [%]). In step S2108, the print control section 220 displays the nominal remaining amount on the display section 228.

In step S2109, the print control section 220 initializes a cumulative amount of consumption (Cumulative amount of consumption=0). In step S2110, the print control section 220 resets a replacement flag. In step S2111, the print control section 220 transmits, to the server apparatus 214, barometric information related to the atmospheric pressure detected by the barometric sensor 231.

In step S2112, the print control section 220 prints a print pattern on a medium. The print pattern include a dot that is printed by the discharge section 226 discharging one or more droplets of printing material at one point on the medium. The print pattern may include one or more dots. When the print pattern includes a plurality of dots, the amount of printing material per droplet may be changed for each dot, or the number of droplets that are discharged at one point on the medium may be changed.

In step S2113, the print control section 220 causes the reading section 230 to read the print pattern printed on the medium. In step S2114, the print control section 220 transmits, to the server apparatus 214, image information containing image data obtained by reading the print pattern. Then, the print control section 220 ends the insertion routine.

Next, a consumption routine that the print control section 220 executes is described with reference to a flow chart shown in FIG. 9. The print control section 220 executes the consumption routine upon execution in the printing apparatus 213 of an operation involving the consumption of a printing material.

For example, the print control section 220 may execute the consumption routine after a printing operation in which the discharge section 226 discharges the printing material through a nozzle and causes the printing material to adhere to a medium. The print control section 220 may execute the consumption routine after a flushing operation in which the discharge section 226 discharges the printing material as a waste material through the nozzle. The print control section 220 may execute the consumption routine after a cleaning operation in which the cleaning section 227 applies negative pressure to a printing material in the discharge section 226 to drain the printing material from the nozzle. The print control section 220 may execute the consumption routine after multiple occurrences of the same one or different ones of the printing operation, the flushing operation, and the cleaning operation.

Figure 9:
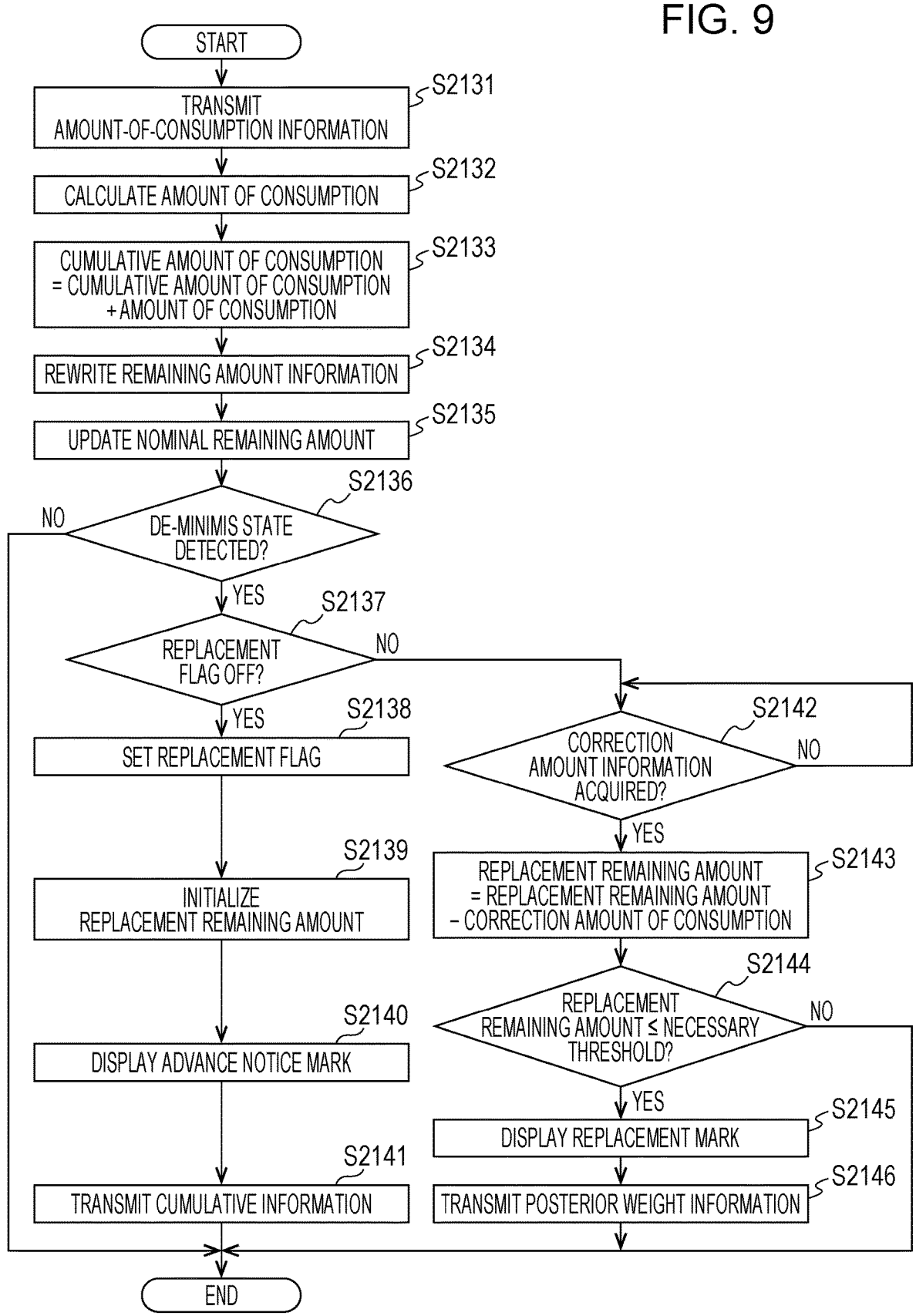
FIG. 9 is a flow chart showing a consumption routine that the print control section according to the second embodiment executes.

As shown in FIG. 9, in step S2131, the print control section 220 transmits, to the server apparatus 214, amount-of-consumption information related to the amount of consumption of a printing material that is consumed by the printing apparatus 213. For example, the amount-of-consumption information is the number of liquid droplets discharged by the discharge section 226 and the number of cleaning operations.

In step S2132, the print control section 220 calculates an amount of consumption. The amount of consumption is a sum of an amount of discharge consumption that is the amount of a printing material discharged by the discharge section 226 and an amount of cleaning consumption that is the amount of a printing material that the cleaning section 227 drained from the discharge section 226 (Amount of consumption=Amount of discharge consumption+Amount of cleaning consumption). The print control section 220 according to the second embodiment has stored therein the amount of a printing material per droplet that the discharge section 226 discharges and the amount of a printing material that is consumed in one cleaning operation. The print control section 220 integrates the number of liquid droplets discharged by the discharge section 226 with the amount per droplet and thereby calculates the amount of discharge consumption consumed in the printing operation and the flushing operation (Amount of discharge consumption=Number of liquid droplets×Amount per droplet). The print control section 220 integrates the number of cleaning operations performed with the amount of a printing material that is consumed in one cleaning operation and thereby calculates the amount of cleaning consumption consumed in the cleaning operation (Amount of cleaning consumption=Number of cleaning operations×Amount per cleaning operation).

In step S2133, the print control section 220 adds the amount of consumption thus calculated to the cumulative amount of consumption stored therein and thereby updates the cumulative amount of consumption (Cumulative amount of consumption=Cumulative amount of consumption+Amount of consumption). In step S2134, the print control section 220 rewrites the remaining amount information stored in the storage medium 239. That is, the print control section 220 updates the remaining amount by subtracting the amount of consumption from the remaining amount stored therein (Remaining amount=Remaining amount−Amount of consumption) and rewrites the remaining amount information stored in the storage medium 239 as remaining amount information related to the remaining amount thus updated.

In step S2135, the print control section 220 updates the nominal remaining amount. Specifically, the print control section 220 calculates, as a nominal remaining amount, the proportion of the remaining amount thus updated to the initial amount and displays, on the display section 228, the nominal remaining amount thus calculated.

In step S2136, the print control section 220 determines whether the detection section 233 has detected a de-minimis state. When the detection section 233 has not detected a de-minimis state (NO in step S2136), the print control section 220 ends the consumption routine. When the detection section 233 has detected a de-minimis state (YES in step S2136), the print control section 220 proceeds to step S2137.

In step S2137, the print control section 220 determines whether the replacement flag is off. When the replacement flat is off (YES in step S2137), the print control section 220 proceeds to step S2138.

In step S2138, the print control section 220 sets the replacement flat. In step S2139, the print control section 220 initializes a replacement remaining amount with the advance notice threshold (Replacement remaining amount=Advance notice threshold). In step S2140, the print control section 220 displays the advance notice mark 236 on the display section 228. In step S2141, the print control section 220 transmits, to the server apparatus 214, cumulative information related to the cumulative amount of consumption. Then, the print control section 220 ends the consumption routine.

When the replacement flag is on in step S2137 (NO in step S2137), the print control section 220 proceeds to step S2142. In step S2142, the print control section 220 determines whether it has acquired correction amount information transmitted from the server apparatus 214. When the print control section 220 has not acquired the correction amount information (NO in step S2142), the print control section 220 waits until it acquires the correction amount information. When the print control section 220 has acquired the correction amount information (YES in step S2142), the print control section 220 proceeds to step S2143. Note here that the correction amount information that the print control section 220 receives is transmitted by the server control section 217 in step S2170 shown in FIG. 10.

In step S2143, the print control section 220 subtracts, from the replacement remaining amount stored therein, a correction amount of consumption indicated by the correction amount information thus acquired and thereby updates the replacement remaining amount (Replacement remaining amount=Replacement remaining amount−Correction amount of consumption). In step S2144, the print control section 220 determines whether the replacement remaining amount is equal to or smaller than the necessary threshold. When the replacement remaining amount is larger than the necessary threshold (NO in step S2144), the print control section 220 ends the consumption routine. When the replacement remaining amount is equal to or smaller than the necessary threshold (YES in step S2144), the print control section 220 proceeds to step S2145.

In step S2145, the print control section 220 displays the replacement mark 237 on the display section 228. In step S2146, the print control section 220 causes the weight sensor 232 to measure the weight of the printing material container 212 and transmits posterior weight information to the server apparatus 214. The posterior weight information is an example of the weight information related to the weight measured. Then, the print control section 220 ends the consumption routine.

Next, a correction routine that the server control section 217 executes is described with reference to a flow chart shown in FIG. 10. The server control section 217 starts the execution of the correction routine when the server apparatus 214 is powered on. In the initial state, a delivery flag is on.

In step S2161, the server control section 217 determines whether it has acquired initial amount information transmitted from the printing apparatus 213. When the server control section 217 has acquired the initial amount information (YES in step S2161), the server control section 217 proceeds to step S2162. Note here that the initial amount information that the server control section 217 receives is transmitted from the print control section 220 in step S2104 shown in FIG. 8.

In step S2162, the server control section 217 rewrites a delivery remaining amount as the initial amount indicated by the initial amount information (Delivery remaining amount=Initial amount). In step S2163, the server control section 217 sets an unused flag. In step S2164, the server control section 217 resets the delivery flag.

When the server control section 217 has not acquired the initial amount information in step S2161 (NO in step S2161), the server control section 217 proceeds to step S2165. In step S2165, the server control section 217 determines whether the server control section 217 has acquired remaining amount information transmitted from the printing apparatus 213. When the server control section 217 has acquired the remaining amount information (YES in step S2165), the server control section 217 proceeds to step S2166. Note here that the remaining amount information that the server control section 217 receives is transmitted by the print control section 220 in step S2106 shown in FIG. 8.

In step S2166, the server control section 217 rewrites the delivery remaining amount as the remaining amount indicated by the remaining amount information (Delivery remaining amount=Remaining amount). In step S2167, the server control section 217 resets the unused flag. Then, the server control section 217 proceeds to step S2164. When the server control section 217 has not acquired the remaining amount information in step S2165 (NO in step S2165), the server control section 217 proceeds to step S2168.

In step S2168, the server control section 217 determines whether it has acquired amount-of-consumption information transmitted from the printing apparatus 213. When the server control section 217 has not received the amount-of-consumption information (NO in step S2168), the server control section 217 proceeds to step S2176. When the server control section 217 has acquired the amount-of-consumption information (YES in step S2168), the server control section 217 proceeds to step S2169. Note here that the amount-of-consumption information that the server control section 217 receives is transmitted by the print control section 220 in step S2131 shown in FIG. 9.

In step S2169, the server control section 217 calculates a correction amount of consumption. In step S2170, the server control section 217 transmits, to the printing apparatus 213, correction amount information related to the correction amount of consumption.

In step S2171, the server control section 217 determines whether the delivery flag is on. When the delivery flag is on (YES in step S2171), the server control section 217 proceeds to step S2176. When the delivery flag is off (NO in step S2171), the server control section 217 proceeds to step S2172.

In step S2172, the server control section 217 subtracts the correction amount of consumption thus calculated from the delivery remaining amount stored therein and thereby updates the delivery remaining amount (Delivery remaining amount=Delivery remaining amount−Correction amount of consumption). In step S2173, the server control section 217 determines whether the delivery remaining amount is equal to or smaller than a delivery threshold. When the delivery remaining amount is larger than the delivery threshold (NO in step S2173), the server control section 217 proceeds to step S2176. When the delivery remaining amount is equal to or smaller than the delivery threshold (YES in step S2173), the server control section 217 proceeds to step S2174.

In step S2174, the server control section 217 orders the delivery terminal 215 to deliver a printing material container 212. That is, the server control section 217 orders that a replacement printing material container 212 that replaces the printing material container 212 inserted in the printing apparatus 213 be delivered to a user of the printing apparatus 213. In step S2175, the server control section 217 sets the delivery flag. Then, the server control section 217 proceeds to step S2176.

In step S2176, the server control section 217 determines whether it has acquired cumulative information transmitted from the printing apparatus 213. When the server control section 217 has not acquired the cumulative information (NO in step S2176), the server control section 217 proceeds to step S2161. When the server control section 217 has acquired the cumulative information (YES in step S2176), the server control section 217 proceeds to step S2177. Note here that the cumulative information that the server control section 217 receives is transmitted by the print control section 220 in step S2141 shown in FIG. 9.

In step S2177, the server control section 217 determines whether the unused flag is on. When the unused flag is off (NO in step S2177), the server control section 217 proceeds to step S2161. When the unused flag is on (YES in step S2177), the server control section 217 proceeds to step S2178.

In step S2178, the server control section 217 calculates an actual amount of consumption during a period from insertion of an unused printing material container 212 into the printing apparatus 213 to a de-minimis state (Actual amount of consumption=Initial amount−Advance notice threshold). In step S2179, the server control section 217 calculates a period of use from insertion of a printing material container 212 into the printing apparatus 213 to a de-minimis state. In step S2180, the server control section 217 calculates a unit amount of consumption that is the amount of a printing material actually consumed per unit period (Unit amount of consumption=Actual amount of consumption/Period of use). In step S2181, the server control section 217 calculates and stores the delivery threshold. Then, the server control section 217 proceeds to step S2161.

The delivery threshold is a value obtained by integrating a delivery period with the unit amount of consumption (Delivery threshold=Delivery period×Unit amount of consumption). The delivery period is a period of time required to deliver a printing material container 212. The delivery period is set according to a base from which a printing material container 212 is delivered, the place of installation of the printing apparatus 213, and the like.

The workings of the second embodiment are described.

The server control section 217 acquires, from the printing apparatus 213, amount-of-consumption information related to the amount of consumption of a printing material that is consumed by the printing apparatus 213. The server control section 217 acquires initial amount information, initial weight information, barometric information, image information, cumulative information, and posterior weight information from the printing apparatus 213 as correction information for correcting the amount-of-consumption information. The server control section 217 calculates correction amount information related to the amount of consumption using the correction information and the amount-of-consumption information and transmits the correction amount information to the printing apparatus 213. The server control section 217 may have the advance notice threshold and the necessary threshold stored in advance therein or may acquire the advance notice threshold and the necessary threshold from the printing apparatus 213.

The initial amount information may contain an initial amount that is the amount of a printing material contained in an unused printing material container 212. The server control section 217 calculates, from the initial amount and the advance notice threshold, an actual amount of consumption that is the amount of a printing material actually consumed during a period from the start of use of the printing material container 212 to detection of a de-minimis state by the detection unit 233 (Actual amount of consumption=Initial amount −Advance notice threshold).

The server control section 217 may calculate, from weight information related to the weight of the printing material container 212, the amount of a printing material actually consumed. The correction information according to the second embodiment may contain the initial weight information and the posterior weight information, which are an example of the weight information on the printing material container 212. The initial weight information indicates an initial weight that is the weight of an unused printing material container 212 just inserted into the mounting portion 223, and the posterior weight information indicates a posterior weight that is the weight of the printing material container 212 whose replacement remaining amount has become equal to or smaller than the necessary threshold. Accordingly, the difference between the initial weight and the posterior weight is an actual amount of consumption that is the amount of a printing material actually consumed during a period from the start of use of the printing material container 212 to a necessary state in which the printing material container 212 needs to be replaced (Actual amount of consumption=Initial weight−Posterior weight).

The correction information according to the second embodiment may contain cumulative information related to a cumulative amount of consumption during a period from the start of use of the printing material container 212 to detection of a de-minimis state by the detection section 233. The cumulative information is for example the mass of the cumulative amount of consumption. The cumulative information may be information from which the mass of the cumulative amount of consumption can be calculated. For example, when the cumulative information contains a cumulative amount of discharge obtained by accumulating amounts of discharge consumption and a cumulative amount of cleaning obtained by accumulating amounts of cleaning consumption, the server control section 217 calculates the cumulative amount of consumption by adding together the cumulative amount of discharge and the cumulative amount of cleaning (Cumulative amount of consumption=Cumulative amount of discharge+Cumulative amount of cleaning). When the cumulative information contains the total number of liquid droplets that is the total number of liquid droplets discharged by the discharge section 226, the server control section 217 may calculate the cumulative amount of discharge by integrating the total number of liquid droplets with the amount per droplet (Cumulative amount of discharge=Total number of liquid droplets×Amount per droplet). When the cumulative information contains the total number of cleaning operations performed, the server control section 217 may calculate a cumulative amount of cleaning by integrating the total number with the amount of a printing material that is consumed in one cleaning operation (Cumulative amount of cleaning=Total number×Amount per cleaning operation). The cumulative information may contain the amount per droplet and the amount per cleaning operation.

The server control section 217 may calculate the correction amount information using a result of a comparison between the actual amount of consumption during a period from the start of use of the printing material container 212 to detection of a de-minimis state by the detection section 233 and the cumulative amount of consumption. For example, when the actual amount of consumption is larger than the cumulative amount of consumption, the correction amount of consumption after correction is made larger than the amount of consumption before correction. When the actual amount of consumption is smaller than the cumulative amount of consumption, the correction amount of consumption after correction is made smaller than the amount of consumption before correction.

The correction information according to the second embodiment may contain image information obtained by reading a print pattern printed by the printing apparatus 213. The image information may contain, in addition to image data obtained by reading the print pattern, information such as the type of the medium on which the print pattern was printed and humidity. When the print pattern is constituted by a dot whose diameter is larger than assumed, the server control section 217 increases the amount of each of liquid droplets that the discharge section 226 discharges. When the print pattern is constituted by a dot whose diameter is smaller than assumed, the server control section 217 decreases the amount of each of liquid droplets that the discharge section 226 discharges.

The correction information according to the second embodiment may contain barometric information on a place in which the printing apparatus 213 is installed. The amount of a printing material that is consumed in a cleaning operation tends to become smaller as the atmospheric pressure becomes lower. When the atmospheric pressure is lower than a low-pressure threshold, the server control section 217 decreases the amount that is consumed in one cleaning operation.

The server control section 217 orders the delivery of a replacement printing material container a delivery period earlier than a necessary time. The delivery period is a period of time required to deliver a replacement printing material container that is inserted into the printing apparatus 213 to replace the printing material container 212, and the necessary time is a time when it becomes necessary to replace the printing material container 212. That is, the server control section 217 calculates a delivery threshold that is the amount of a printing material that is needed during the delivery period. When a delivery remaining amount that is calculated using the correction amount information has reached the delivery threshold, the server control section 217 orders the delivery of a printing material container 212. This makes it possible to deliver a replacement printing material container 212 to a user by the necessary time when the remaining amount of the printing material container 212 reaches the necessary threshold and it becomes necessary to replace the printing material container 212.

Upon detection of a de-minimis state by the detection section 233, the print control section 220 rewrites the replacement remaining amount as the advance notice threshold and, after that, calculates the replacement remaining amount using the correction amount of consumption. Therefore, even when there is a discrepancy between the amount of consumption calculated and the actual amount of consumption, the discrepancy between the timing at which the replacement remaining amount reaches the necessary threshold and the timing at which the actual remaining amount reaches the necessary threshold can be reduced.

The effects of the second embodiment are described.

(1) The server apparatus 214 calculates correction amount information using amount-of-consumption information and correction information acquired from the printing apparatus 213 and transmits the correction amount information to the printing apparatus 213. This makes it possible to, as compared with a case where the printing apparatus 213 calculates correction amount information, reduce the discrepancy between the remaining amount of printing material calculated and the actual remaining amount of printing material while reducing the load on the printing apparatus 213.

(2) The printing apparatus 213 may print by causing a liquid droplet of printing material to adhere to a medium. The liquid droplet of printing material forms a dot when it adheres to the medium. The diameter of the dot that is formed on the medium varies according the amount of a printing material that constitutes the liquid droplet. Therefore, the amount of printing material per droplet can be calculated from the diameter of the dot. However, a process of calculating the diameter of the dot through analysis of an image and calculating the amount of printing material from the diameter of the dot imposes a heavy load. In that regard, the correction information contains image information obtained by reading a print pattern. This makes it possible to perform a heavy-load process with the server apparatus 214 and reduce the load on the printing apparatus 213.

(3) The amount of a printing material actually consumed during a period from the start of use of the printing material container 212 to a de-minimis state can be calculated from the amount of a printing material that is contained in the printing material container 212 at the start of use and the advance notice threshold. The detection section 233 detects that the printing material container 212 is in a de-minimis state. The correction information contains cumulative information related to a cumulative amount of consumption during a period from the start of use of the printing material container 212 to detection of a de-minimis state by the detection section 233. Accordingly, the server apparatus 214 can compare the amount of a printing material actually consumed with the cumulative amount of consumption calculated, bringing about improvement in correction accuracy.

(4) The correction information contains weight information on the printing material container 212. The weight of the printing material container 212 decreases by the amount of a printing material supplied from the printing material container 212 and consumed by the printing apparatus 213. Therefore, the amount of a printing material actually consumed can be calculated from the weight information. Accordingly, the server apparatus 214 can compare the amount of a printing material actually consumed with the amount of consumption calculated, bringing about improvement in correction accuracy.

(5) For example, in the printing apparatus 213, which prints by discharging a liquid printing material from the discharge section 226, the amount of a printing material that is consumed along with a cleaning of the discharge section 226 may vary depending on the atmospheric pressure. In that regard, the correction information, which contains barometric information, brings about improvement in correction accuracy.

(6) The delivery of a replacement printing material container is ordered a delivery period earlier than a necessary period. The delivery period is a period of time required to deliver the replacement printing material container, and the necessary time is a time when it becomes necessary to replace the printing material container 212. This makes it possible to deliver the replacement printing material container to a user of the printing apparatus 213 by the time when the remaining amount of a printing material that the printing material container 212 contains reaches the necessary threshold. This makes it possible to save the user the trouble of arranging the delivery of a replacement printing material container and the trouble of managing inventory.

Third Embodiment

Next, a third embodiment of a server apparatus and a printing system is described with reference to the drawings. It should be noted that the third embodiment differs from the second embodiment in terms of the insertion routine and the consumption routine that the print control section 220 executes and the correction routine that the server control section 217 executes. Moreover, since the third embodiment is substantially the same as the second embodiment in other respects, a repeated description is omitted by assigning identical reference signs to identical components and identical steps.

An insertion routine that the print control section 220 executes is described with reference to a flow chart shown in FIG. 11. The insertion routine according to the third embodiment differs from the insertion routine shown in FIG. 8 according to the second embodiment in terms of the portion surrounded by dot-and-dash lines.

The print control section 220 executes steps S2101 to S2106 as in the case of the second embodiment, executes steps S2221 to S2223 surrounded by the dot-and-dash lines, and then executes steps S2107 to S2114 as in the case of the second embodiment.

Specifically, after having executed step S2105, the print control section 220 proceeds to step S2221, in which the print control section 220 rewrites the delivery remaining amount as the initial amount indicated by the initial amount information (Delivery remaining amount=Initial amount). In step S2222, the print control section 220 resets the delivery flag. Then, the print control section 220 proceeds to step S2107.

After having executed step S2106, the print control section 220 proceeds to step S2223, in which the print control section 220 rewrites the delivery remaining amount as the remaining amount indicated by the remaining amount information (Delivery remaining amount=Remaining amount). Then, the print control section 220 proceeds to step S2222.

Figure 12:
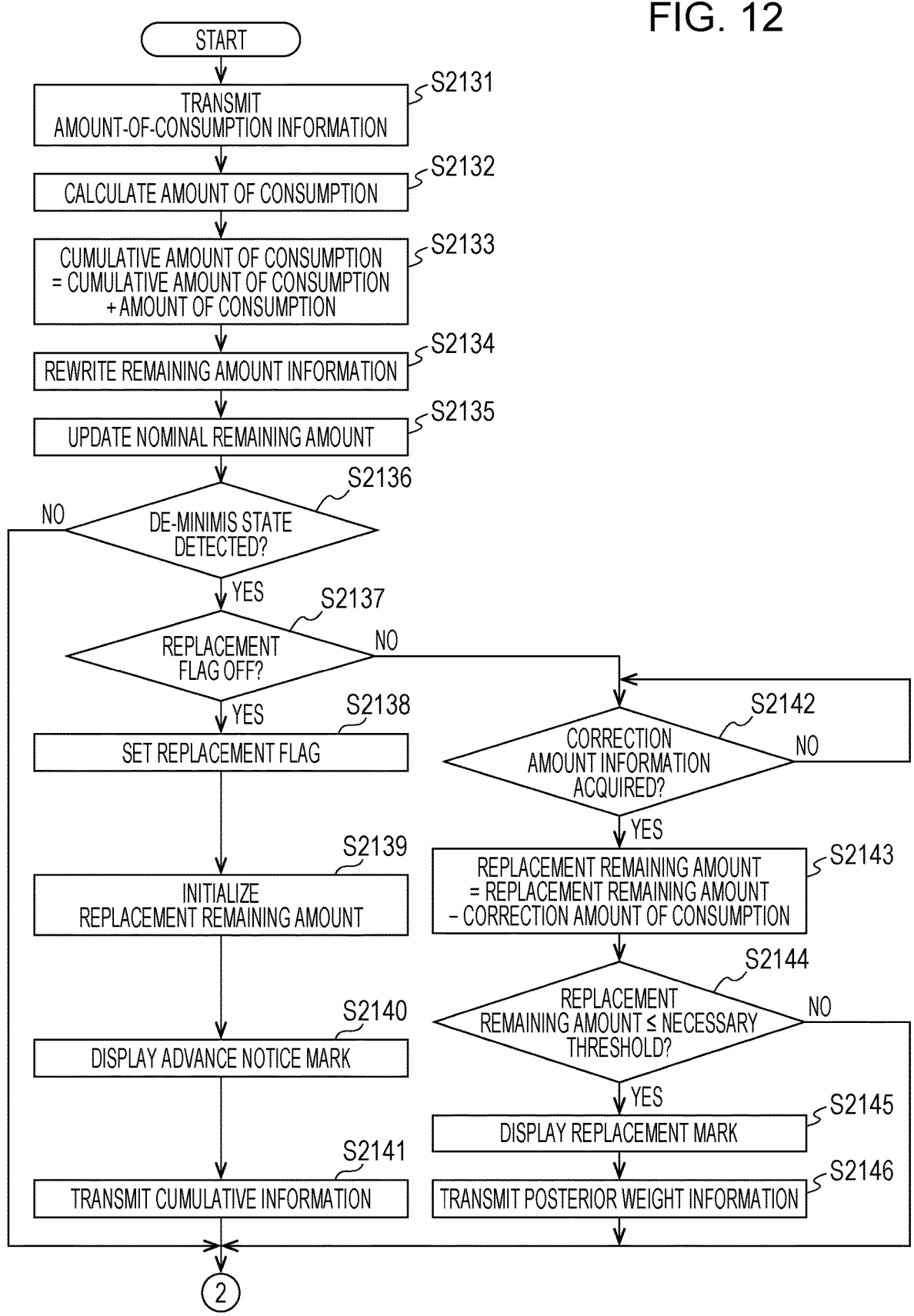
FIG. 12 is a flow chart showing a consumption routine that the print control section according to the third embodiment executes.

Next, a consumption routine that the print control section 220 executes is described with reference to flow charts shown in FIGS. 12 and 13.

Figure 13:
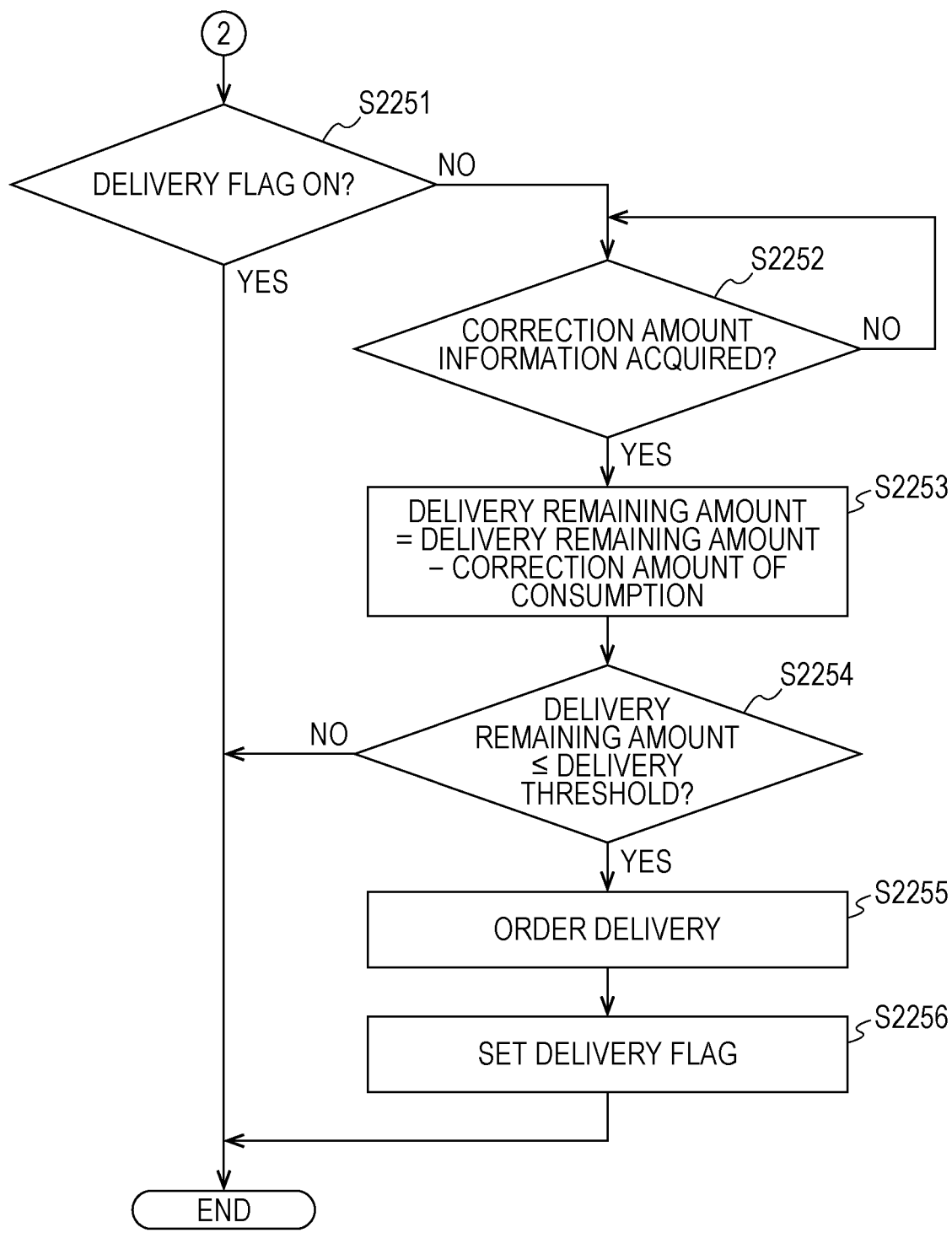
FIG. 13 is a flow chart showing the consumption routine that the print control section according to the third embodiment executes.

In the consumption routine according to the third embodiment, steps S2251 to S2256 shown in FIG. 13 are executed after steps S2131 to S2146 have been executed as in the case of the consumption routine shown in FIG. 9 according to the second embodiment.

As shown in FIG. 13, in step S2251, the print control section 220 determines whether the delivery flag is on. When the delivery flag is on (YES in step S2251), the print control section 220 ends the process. When the delivery flag is off (NO in step S2251), the print control section 220 proceeds to step S2252.

In step S2252, the print control section 220 determines whether it has acquired correction amount information transmitted from the server apparatus 214. When the print control section 220 has not acquired the correction amount information (NO in step S2252), the print control section 220 waits until it acquires the correction amount information. When the print control section 220 has acquired the correction amount information (YES in step S2252), the print control section 220 proceeds to step S2253. Note here that the correction amount information that the print control section 220 receives is transmitted by the server control section 217 in step S2170 shown in FIG. 14.

In step S2253, the print control section 220 subtracts a correction amount of consumption based on the correction amount information from the delivery remaining amount stored therein and thereby updates the delivery remaining amount (Delivery remaining amount=Delivery remaining amount−Correction amount of consumption). In step S2254, the print control section 220 determines whether the delivery remaining amount is equal to or smaller than a delivery threshold. When the delivery remaining amount is larger than the delivery threshold (NO in step S2254), the print control section 220 ends the process. When the delivery remaining amount is equal to or smaller than the delivery threshold (YES in step S2254), the print control section 220 proceeds to step S2255.

In step S2255, the print control section 220 orders the delivery terminal 215 to deliver a printing material container 212. That is, the print control section 220 orders that a replacement printing material container 212 that replaces the printing material container 212 inserted in the printing apparatus 213 be delivered to a user of the printing apparatus 213. In step S2256, the print control section 220 sets the delivery flag. Then, the print control section 220 ends the process.

Figure 14:
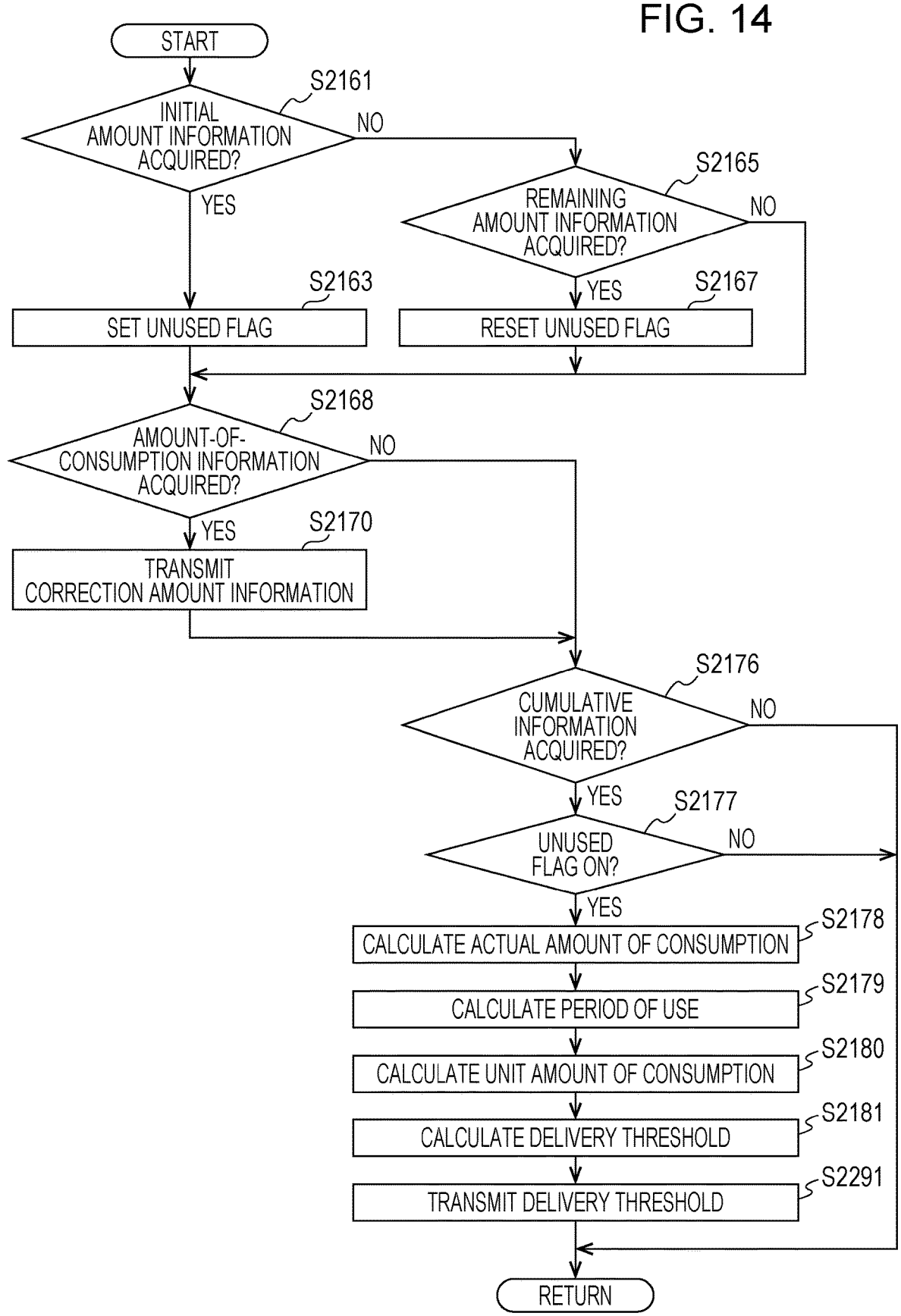
FIG. 14 is a flow chart showing a correction routine that a server control section according to the third embodiment executes.

Next, a correction routine that the server control section 217 executes is described with reference to a flow chart shown in FIG. 14.

Figure 10:
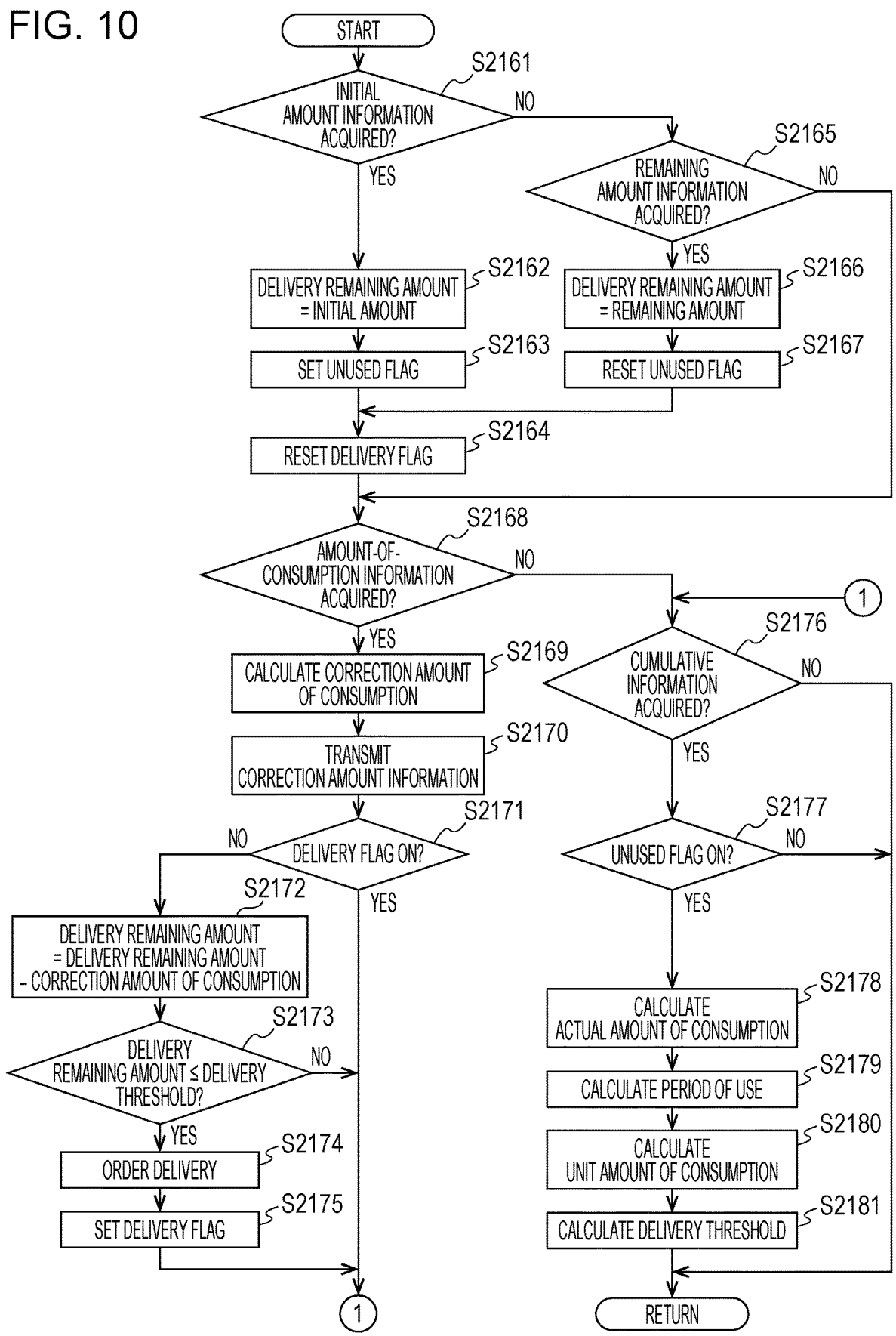
FIG. 10 is a flow chart showing a correction routine that a server control section according to the second embodiment executes.

In the correction routine according to the third embodiment, the correction routine shown in FIG. 10 according to the second embodiment is partially omitted, and step S2291 is executed after step S2181. In step S2291, the server control section 217 transmits, to the printing apparatus 213, the delivery threshold calculated in step S2181.

The workings of the third embodiment are described.

The print control section 220 orders the delivery terminal 215 to deliver a replacement printing material container that is inserted into the printing apparatus 213 to replace the printing material container 212 inserted in the printing apparatus 223. The print control section 220 orders the delivery of a replacement printing material container a delivery period earlier than a necessary time. The delivery period is a period of time required to deliver the replacement printing material container, and the necessary time is a time when it becomes necessary to replace the printing material container 212.

Fourth Embodiment

Next, a fourth embodiment of a server apparatus and a printing system is described with reference to the drawings. It should be noted that the fourth embodiment differs from the second embodiment in terms of the consumption routine that the print control section 220 executes and the correction routine that the server control section 217 executes. Moreover, since the fourth embodiment is substantially the same as the second embodiment in other respects, a repeated description is omitted by assigning identical reference signs to identical components and identical steps.

In the fourth embodiment, an insertion routine that the print control section 220 executes is the same as the insertion routine shown in FIG. 8 according to the second embodiment. Therefore, an illustration and description of the insertion routine according to the fourth embodiment are omitted.

Next, a consumption routine that the print control section 220 executes is described with reference to a flow chart shown in FIG. 15. In the consumption routine according to the fourth embodiment, steps S2351 and S2352 are executed instead of step S2142 shown in FIG. 9 according to the second embodiment.

In step S2351, the print control section 220 determines whether it has acquired a correction coefficient transmitted from the server apparatus 214. When the print control section 220 has not acquired the correction coefficient (NO in step S2351), the print control section 220 waits until it acquires the correction coefficient. When the print control section 220 has acquired the correction coefficient (YES in step S2351), the print control section 220 proceeds to step S2352. Note here that the correction coefficient that the print control section 220 receives is transmitted by the server control section 217 in step S2392 shown in FIG. 16. In step S2352, the print control section 220 calculates a correction amount of consumption.

The print control section 220 corrects the consumption amount information with the correction coefficient and calculates the correction amount of consumption. For example, the print control section 220 may calculate the correction amount of consumption by integrating the amount of consumption with the correction coefficient (Correction amount of consumption=Amount of consumption×Correction coefficient). The correction coefficient may include a discharging correction coefficient for correcting the amount of a printing material per droplet that the discharge section 226 discharges and a cleaning correction coefficient for correcting the amount of a printing material that is consumed in one cleaning operation. The print control section 220 integrates the number of liquid droplets discharged by the discharge section 226 with the amount per droplet and the discharging correction coefficient and thereby calculates a correction amount of discharge consumed in a printing operation and a flushing operation (Correction amount of discharge=Number of liquid droplets×Amount per droplet× Discharging correction coefficient). The print control section 220 integrates the number of cleaning operations performed with the amount of a printing material that is consumed in one cleaning operation and the cleaning correction coefficient and thereby calculates a correction amount of cleaning consumed in a cleaning operation (Amount of cleaning consumption=Number of cleaning operations×Amount per cleaning operation×Cleaning correction coefficient). The print control section 220 calculates the correction amount of consumption by adding together the correction amount of discharge and the correction amount of cleaning (Correction amount of consumption=Correction amount of discharge+ Correction amount of cleaning).

Figure 16:
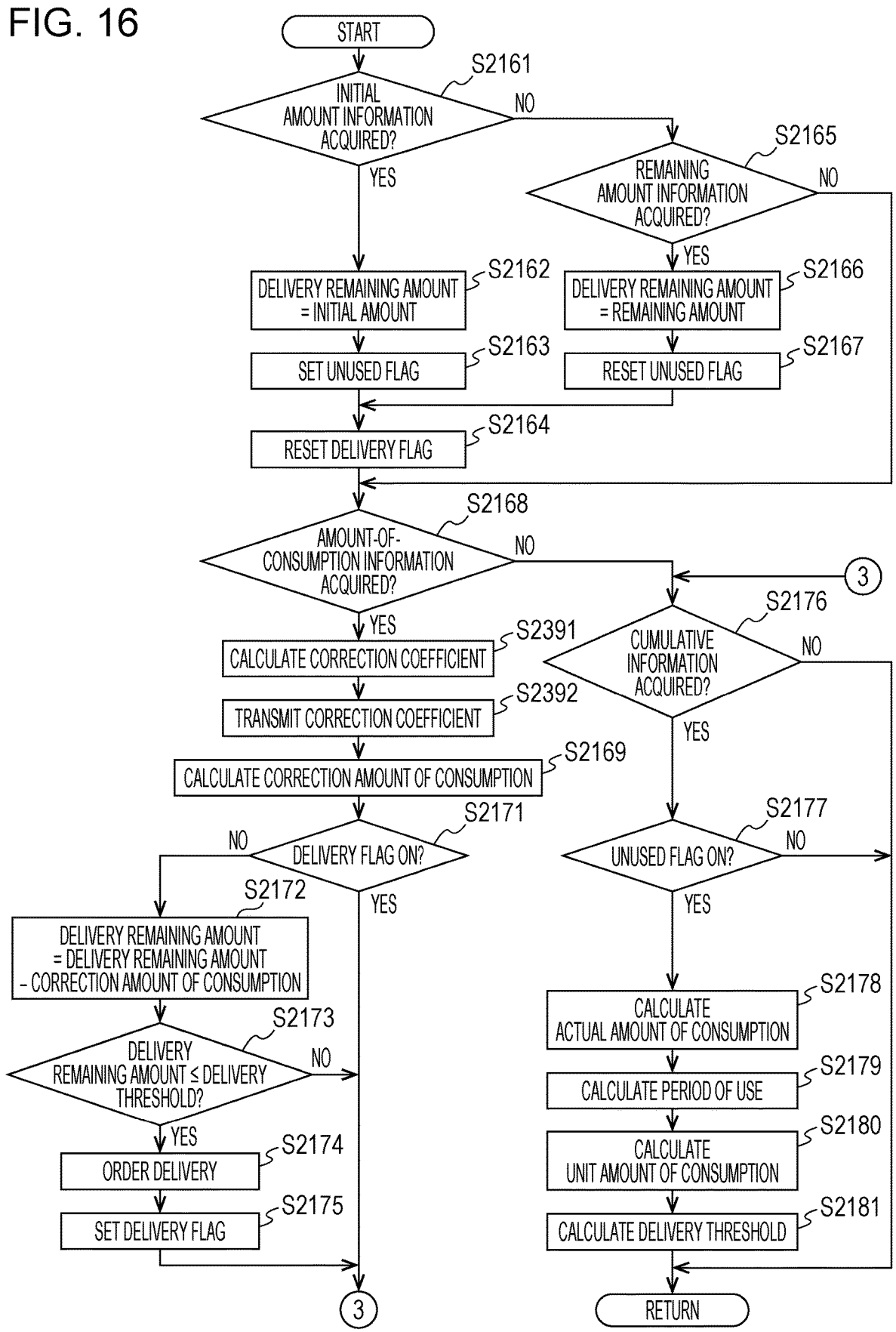
FIG. 16 is a flow chart showing a correction routine that a server control section according to the fourth embodiment executes.

Next, a correction routine that the server control section 217 executes is described with reference to a flow chart shown in FIG. 16.

In the correction routine according to the fourth embodiment, the correction routine shown in FIG. 10 according to the second embodiment is partially omitted, and steps S2391 and S2392 are executed when YES in step S2168. In step S2391, the server control section 217 calculates a correction coefficient for correcting amount-of-consumption information related to the amount of consumption of a printing material that is consumed by the printing apparatus 213. In step S2392, the server control section 217 transmits the correction coefficient thus calculated to the printing apparatus 213.

The workings of the fourth embodiment are described.

The server control section 217 transmits the correction coefficient thus calculated to the printing apparatus 213. The print control section 220 calculates a correction amount of consumption using the correction coefficient. The server control section 217 orders the delivery terminal 215 to deliver a replacement printing material container that is inserted into the printing apparatus 213 to replace the printing material container 212 inserted in the mounting portion 223.

The server control section 217 may calculate the correction coefficient using a result of a comparison between the actual amount of consumption and the cumulative amount of consumption. For example, when the actual amount of consumption is larger than the cumulative amount of consumption, the server control section 217 may make the correction coefficient larger than 1. When the actual amount of consumption is smaller than the cumulative amount of consumption, the server control section 217 may make the correction coefficient smaller than 1.

The server control section 217 analyzes image information and, when the print pattern is constituted by a dot whose diameter is larger than assumed, may make the discharging correction coefficient larger than 1. When the print pattern is constituted by a dot whose diameter is smaller than assumed, the server control section 217 may make the discharging correction coefficient smaller than 1.

When the atmospheric pressure is lower than the threshold, the server control section 217 may make the cleaning correction coefficient smaller than 1. When the atmospheric pressure is higher than the threshold, the server control section 217 may make the cleaning correction coefficient larger than 1.

The effects of the fourth embodiment are described.

(7) The server apparatus 214 calculates a correction coefficient using correction information acquired from the printing apparatus 213 and transmits the correction coefficient thus calculated to the printing apparatus 213. By calculating a correction amount of consumption using the correction coefficient thus received, the printing apparatus 213 can make the load of a process that is performed by the printing apparatus 213 lighter than in a case where the printing apparatus 213 calculates a correction coefficient. This makes it possible to reduce the discrepancy between the remaining amount of printing material calculated and the actual remaining amount of printing material while reducing the load on the printing apparatus 213.

Fifth Embodiment

Next, a fifth embodiment of a server apparatus and a printing system is described with reference to the drawings. It should be noted that the fifth embodiment differs from the second embodiment in terms of the insertion routine and the consumption routine that the print control section 220 executes and the correction routine that the server control section 217 executes. Moreover, since the fifth embodiment is substantially the same as the second embodiment in other respects, a repeated description is omitted by assigning identical reference signs to identical components and identical steps.

Figure 11:
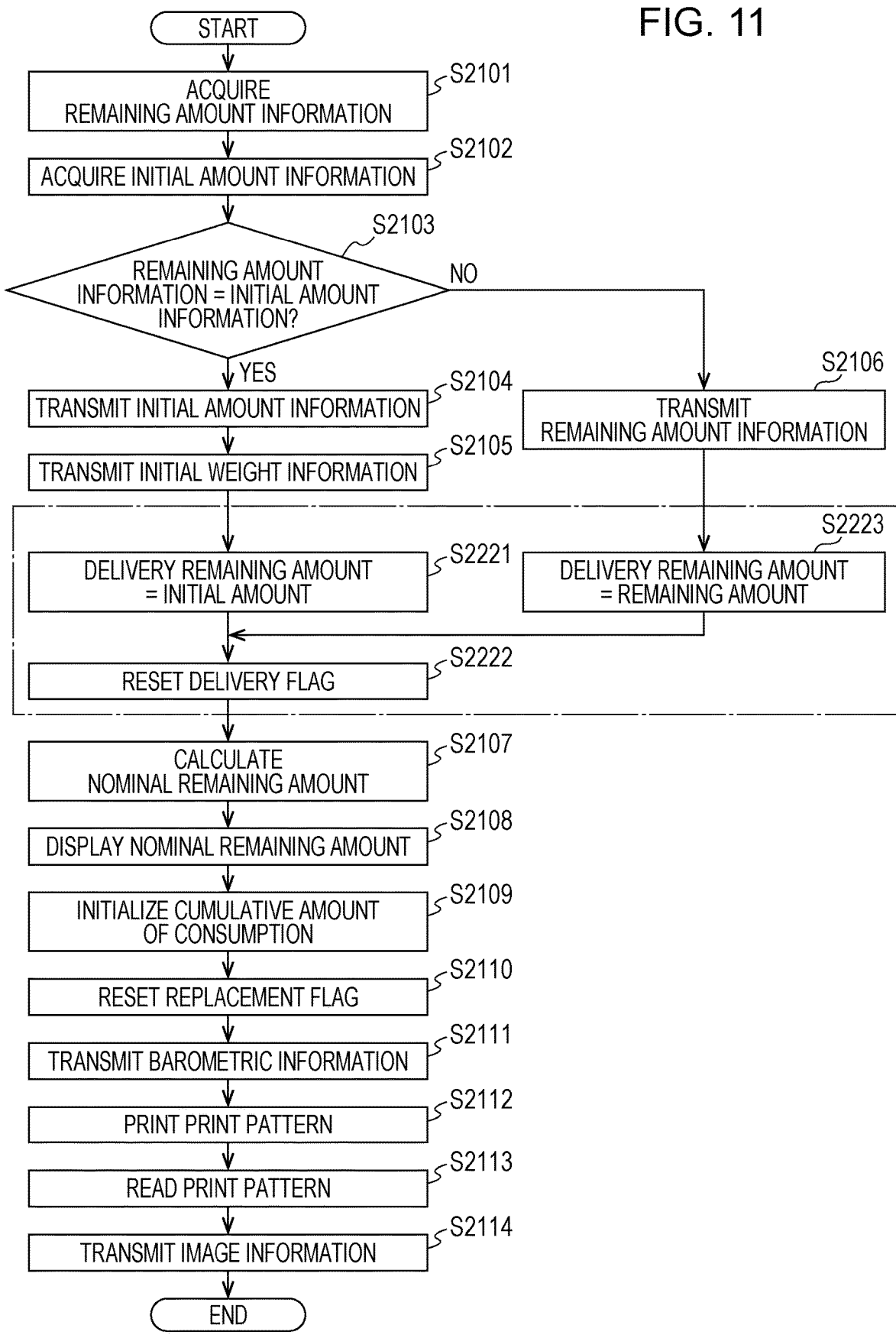
FIG. 11 is a flow chart showing an insertion routine that a print control section according to a third embodiment executes.

In the fifth embodiment, an insertion routine that the print control section 220 executes is the same as the insertion routine shown in FIG. 11 according to the third embodiment. Therefore, an illustration and description of the insertion routine according to the fifth embodiment are omitted.

Next, a consumption routine that the print control section 220 executes is described with reference to flow charts shown in FIGS. 17 and 18.

Figure 15:
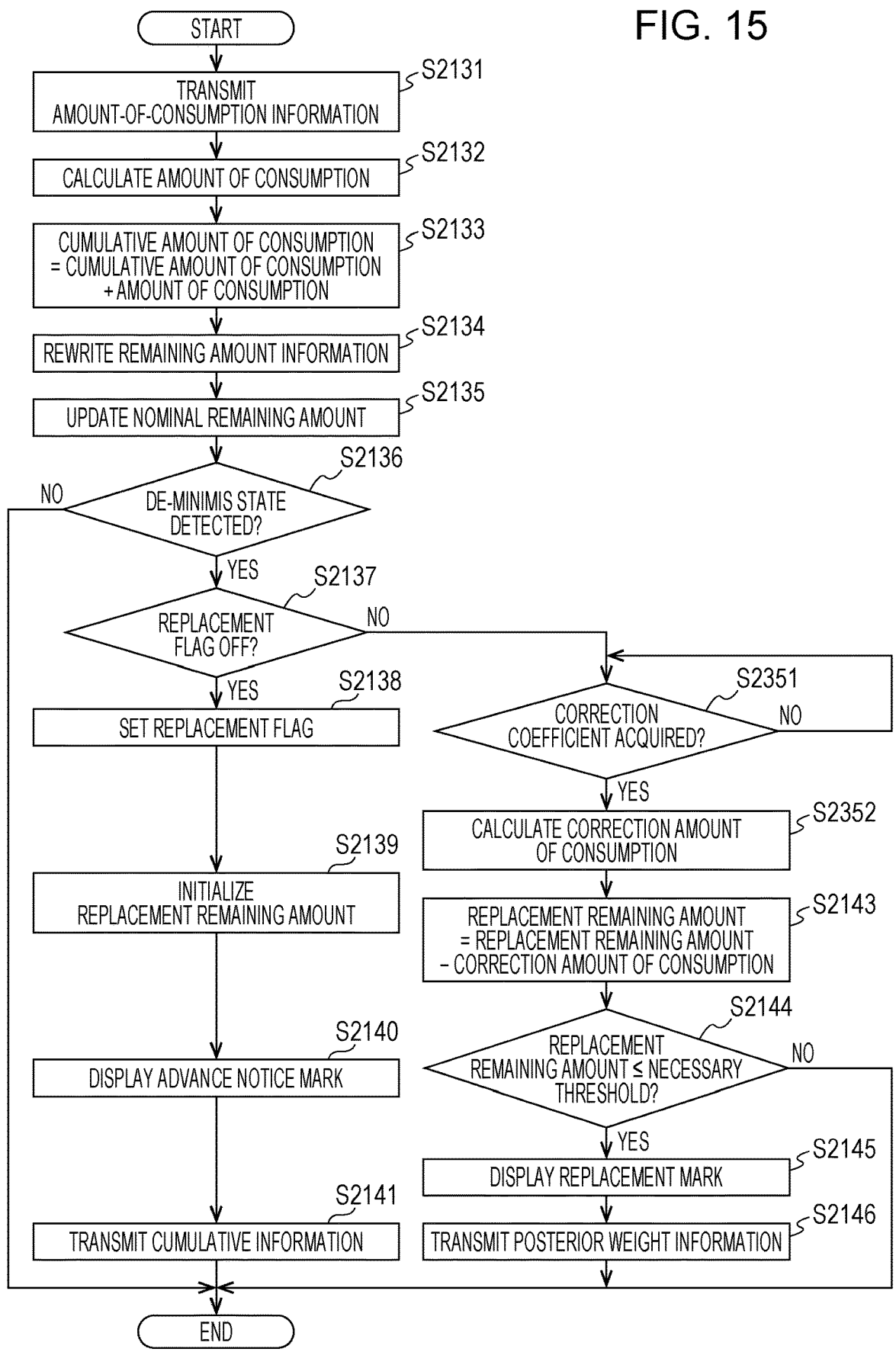
FIG. 15 is a flow chart showing a consumption routine that a print control section according to a fourth embodiment executes.
Figure 17:
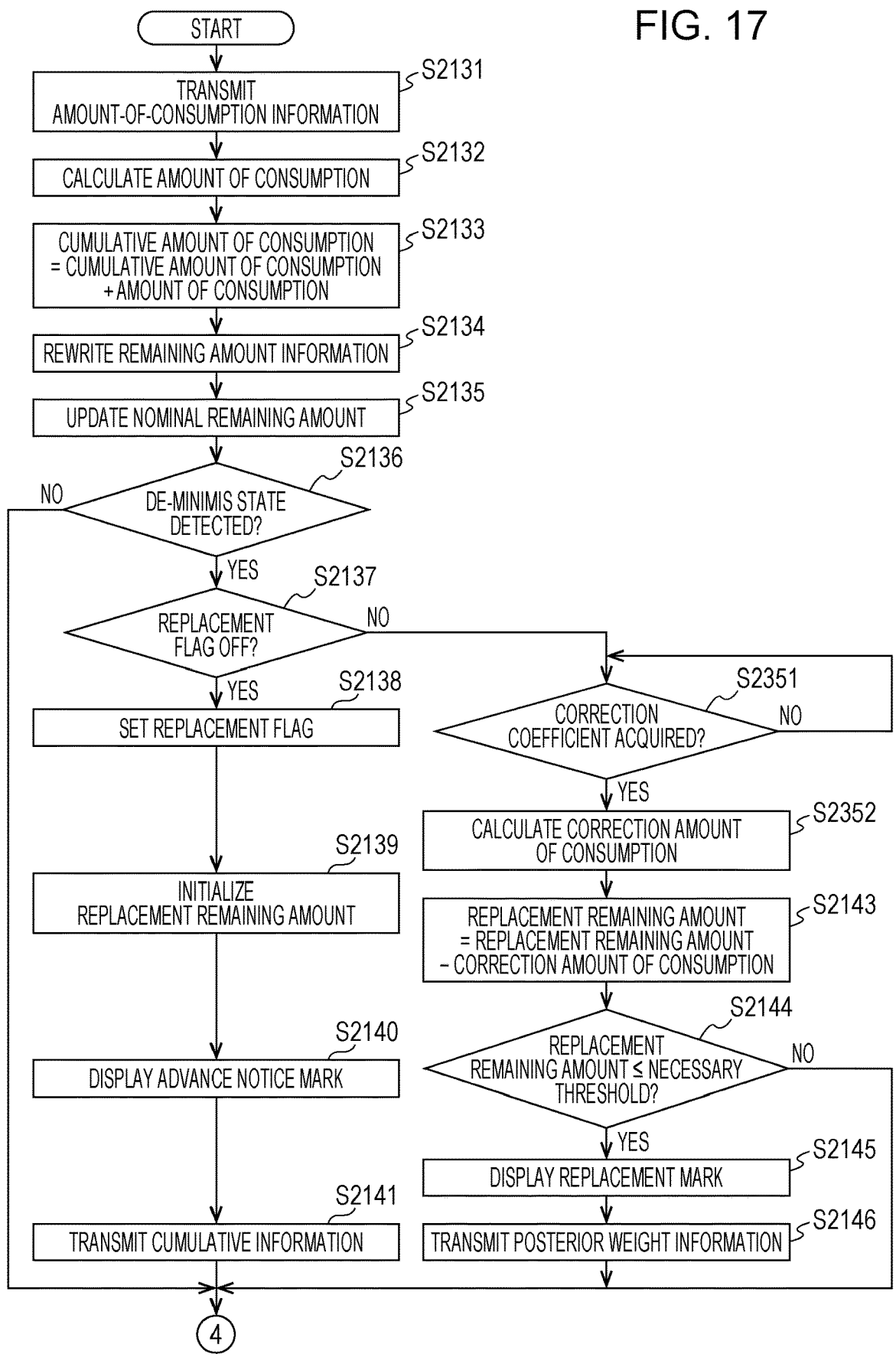
FIG. 17 is a flow chart showing a consumption routine that a print control section according to a fifth embodiment executes.
Figure 18:
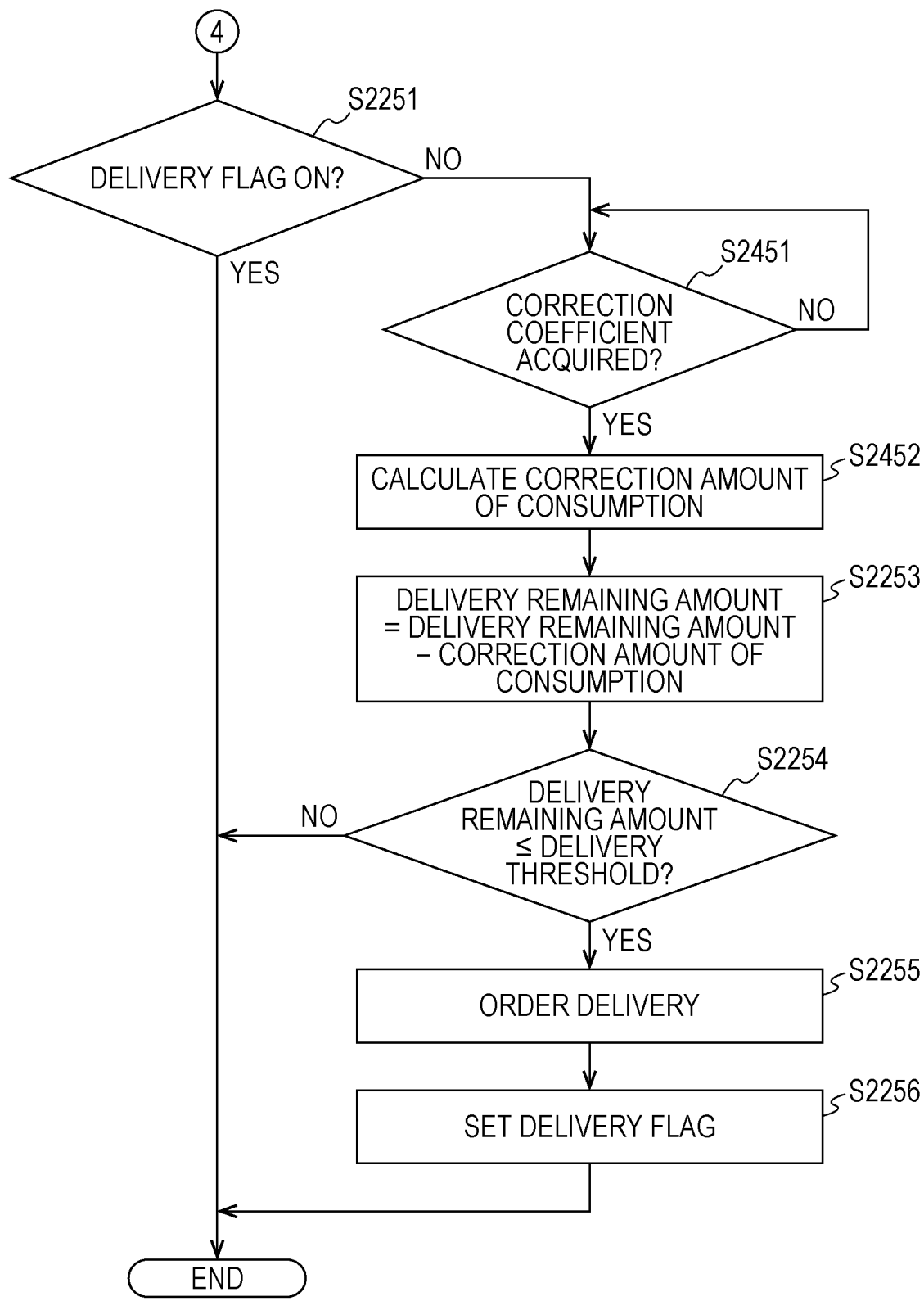
FIG. 18 is a flow chart showing a consumption routine that the print control section according to the fifth embodiment executes.

That portion of the consumption routine according to the fifth embodiment which is shown in FIG. 17 is the same as the process shown in FIG. 15 according to the fourth embodiment. In the portion shown in FIG. 18, steps S2451 and S2452 are executed instead of step S2252 of steps S2251 to S2256 shown in FIG. 13 according to the third embodiment.

In step S2451, the print control section 220 determines whether it has acquired a correction coefficient transmitted from the server apparatus 214. When the print control section 220 has not acquired the correction coefficient (NO in step S2451), the print control section 220 waits until it acquires the correction coefficient. When the print control section 220 has acquired the correction coefficient (YES in step S2451), the print control section 220 proceeds to step S2452. Note here that the correction coefficient that the print control section 220 receives is transmitted by the server control section 217 in step S2392 shown in FIG. 19. In step S2452, the print control section 220 calculates a correction amount of consumption.

Figure 19:
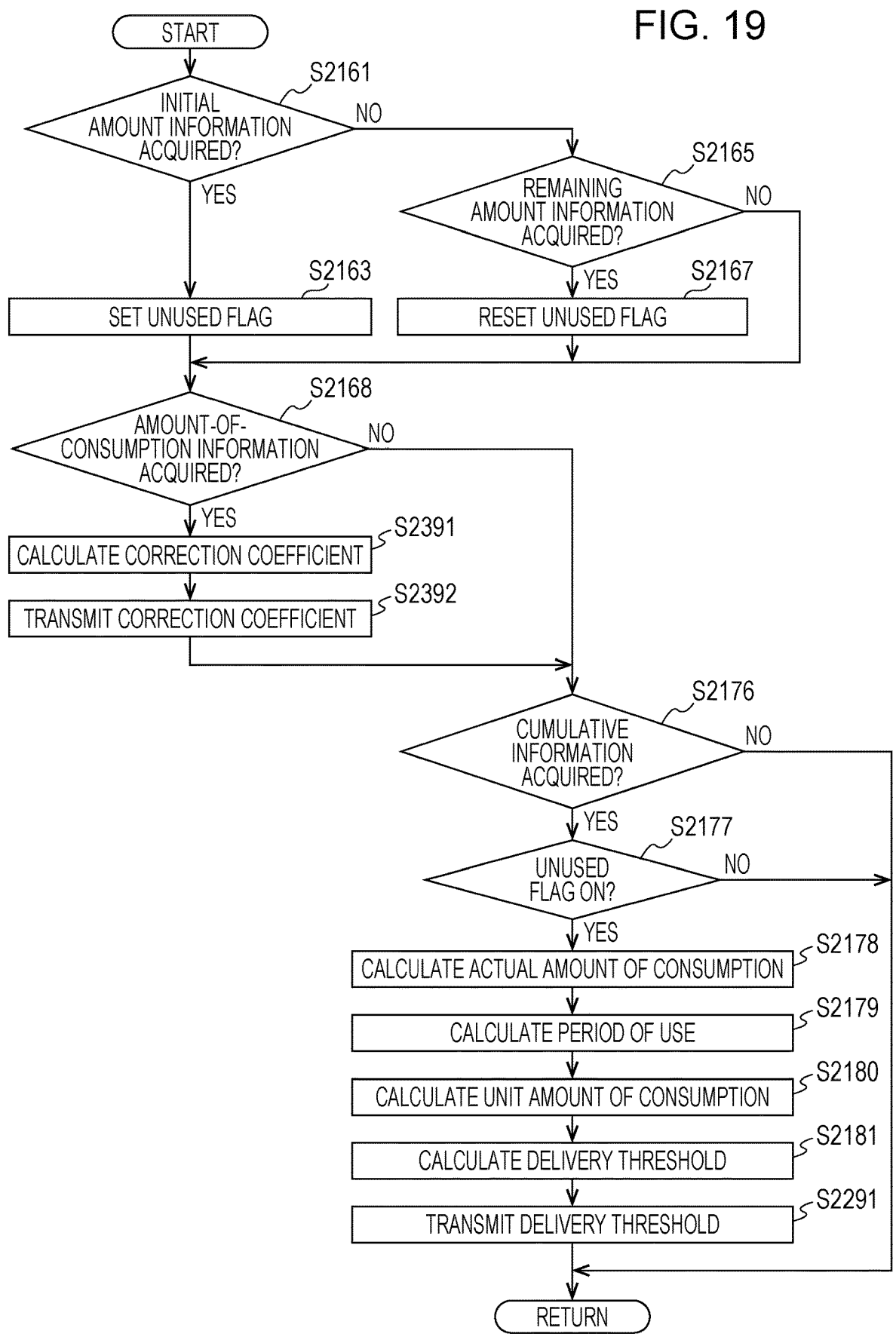
FIG. 19 is a flow chart showing a correction routine that a server control section according to the fifth embodiment executes.

Next, a correction routine that the server control section 217 executes is described with reference to a flow chart shown in FIG. 19.

In the correction routine according to the fifth embodiment, the correction routine shown in FIG. 10 according to the second embodiment is partially omitted, and steps S2391 and S2392 are executed as in the case of the fourth embodiment when YES in step S2168. In the correction routine according to the fifth embodiment, step S2291 is executed as in the case of the third embodiment after step S2181.

The workings of the fifth embodiment are described.

The server control section 217 calculates, using correction information, a correction coefficient for correcting the amount of consumption of a printing material that is consumed by the printing apparatus 213, and transmits the correction coefficient thus calculated to the printing apparatus 213. The print control section 220 orders the delivery terminal 215 to deliver a replacement printing material container that is inserted into the printing apparatus 213 to replace the printing material container 212 inserted in the mounting portion 223.

Sixth Embodiment

Next, a sixth embodiment of a server apparatus and a printing system is described with reference to the drawings. It should be noted that the sixth embodiment differs from the second embodiment in terms of the consumption routine that the print control section 220 executes and the correction routine that the server control section 217 executes. Moreover, since the sixth embodiment is substantially the same as the second embodiment in other respects, a repeated description is omitted by assigning identical reference signs to identical components and identical steps.

In the sixth embodiment, an insertion routine that the print control section 220 executes is the same as the insertion routine shown in FIG. 8 according to the second embodiment. Therefore, an illustration and description of the insertion routine according to the sixth embodiment are omitted.

A consumption routine that the print control section 220 executes is described with reference to a flow chart shown in FIG. 20. In the correction routine according to the sixth embodiment, the process according to the second embodiment is partially omitted, and step S2551 is executed when NO in step S2137.

In step S2551, the print control section 220 determines whether it has acquired state information. When the print control section 220 has acquired the state information (YES in step S2551), the print control section 220 proceeds to step S2145. When the print control section 220 has not acquired the state information (NO in step S2551), the print control section 220 ends the process.

Next, a correction routine that the server control section 217 executes is described with reference to a flow chart shown in FIG. 21.

In the correction routine according to the sixth embodiment, the correction routine shown in FIG. 10 according to the second embodiment is partially omitted, and steps S2591 to S2594 are executed in the middle of the process.

Specifically, after step S2169, the server control section 217 updates the replacement remaining amount in step S2591 (Replacement remaining amount=Replacement remaining amount−Correction amount of consumption). In step S2592, the server control section 217 determines whether the replacement remaining amount is equal to or smaller than the necessary threshold. When the replacement remaining amount is larger than the necessary threshold (NO in step S2592), the print control section 220 proceeds to step S2171. When the replacement remaining amount is equal to or smaller than the necessary threshold (YES in step S2592), the print control section 220 proceeds to step S2593. In step S2593, the server control section 217 transmits the state information to the printing apparatus 213. Then, the server control section 217 proceeds to step S2171.

Step S2594 is executed when YES in step S2176. In step S2594, the server control section 217 initializes the replacement threshold with the advance notice threshold (Replacement threshold=Advance notice threshold).

The workings of the sixth embodiment are described.

The server control section 217 orders the delivery terminal 215 to deliver a replacement printing material container that is inserted into the printing apparatus 213 to replace the printing material container 212 inserted in the mounting portion 223.

The server control section 217 transmits state information related to the state of the printing material container 212 to the printing apparatus 213 based on contained amount information related to the amount of a printing material that the printing material container 212 contains and correction amount information. Specifically, the server control section 217 transmits the state information to the printing apparatus 213 based on the contained amount information and the remaining amount information, which are an example of the contained amount information related to the amount of a printing material that the printing material container 212 contains, and the initial weight information, the barometric information, the image information, the cumulative information, and the posterior weight information, which are an example of the correction amount information.

The server control section 217 according to the sixth embodiment transmits the state information when the replacement remaining amount is equal to or smaller than the necessary threshold. Therefore, the state information indicates that the printing material container 212 is in need of replacement. Upon acquiring the state information, the print control section 220 displays the replacement mark 237 on the display section 228 to notify a user that the printing material container 212 needs to be replaced.

The effects of the sixth embodiment are described.

(8) The server apparatus 214 transmits state information to the printing apparatus 213 based on consumption amount information and correction information acquired from the printing apparatus 213 and initial amount information or remaining amount information related to the amount of a printing material that the printing material container 212 contains. This makes it possible to, as compared with a case where the printing apparatus 213 calculates state information, reduce the discrepancy between a calculated state of the printing material container 212 and an actual state of the printing material container 212 while reducing the load on the printing apparatus 213. This makes it possible to reduce the discrepancy between the remaining amount of printing material calculated and the actual remaining amount of printing material.

Seventh Embodiment

Next, a seventh embodiment of a server apparatus and a printing system is described with reference to the drawings. It should be noted that the seventh embodiment differs from the second embodiment in terms of the insertion routine and the consumption routine that the print control section 220 executes and the correction routine that the server control section 217 executes. Moreover, since the seventh embodiment is substantially the same as the second embodiment in other respects, a repeated description is omitted by assigning identical reference signs to identical components and identical steps.

In the seventh embodiment, an insertion routine that the print control section 220 executes is the same as the insertion routine shown in FIG. 11 according to the third embodiment. Therefore, an illustration and description of the insertion routine according to the seventh embodiment are omitted.

Figure 22:
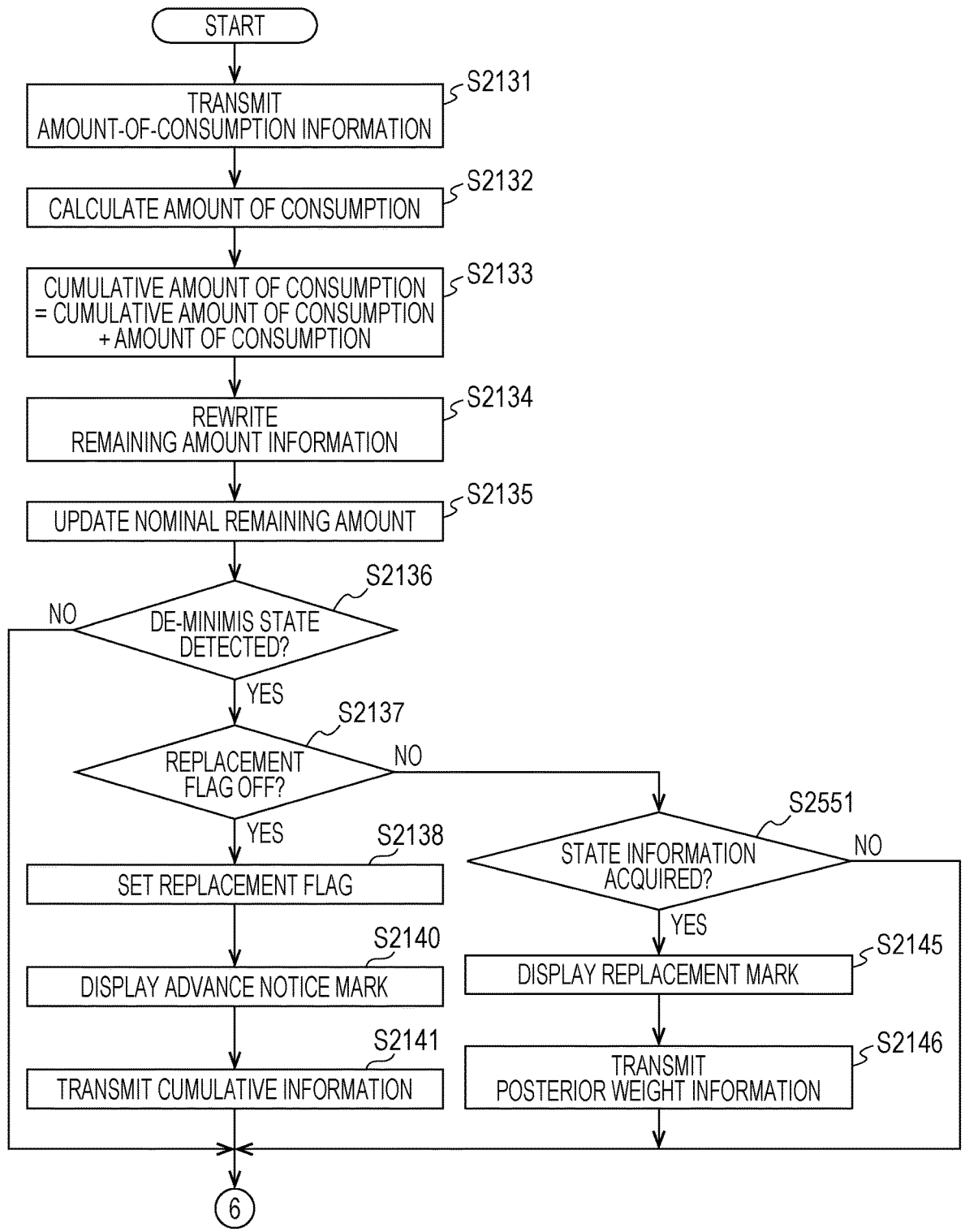
FIG. 22 is a flow chart showing a consumption routine that a print control section according to a seventh embodiment executes.
Figure 23:
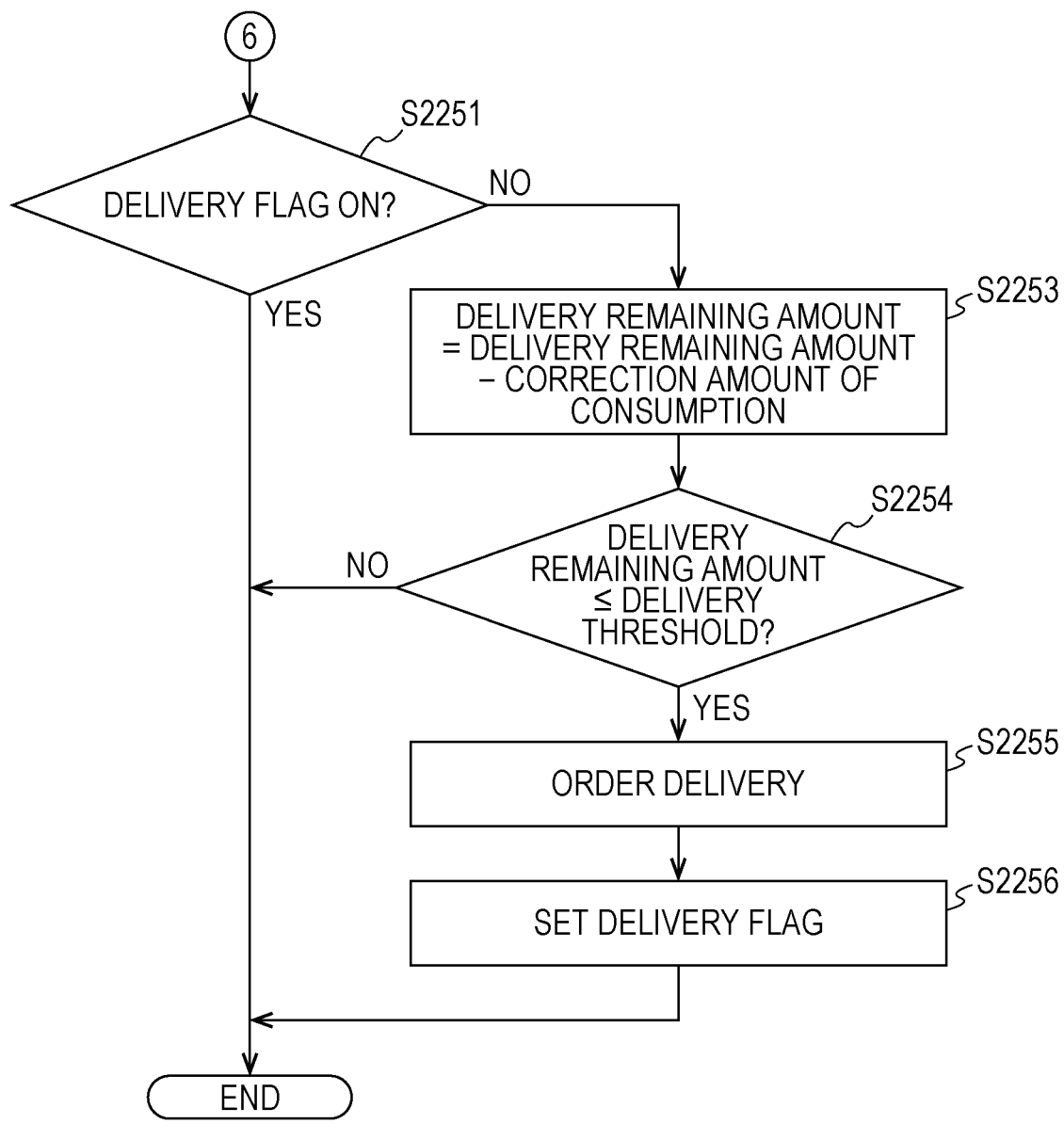
FIG. 23 is a flow chart showing the consumption routine that the print control section according to the seventh embodiment executes.

Next, a consumption routine that the print control section 220 executes is described with reference to flow charts shown in FIGS. 22 and 23.

Figure 20:
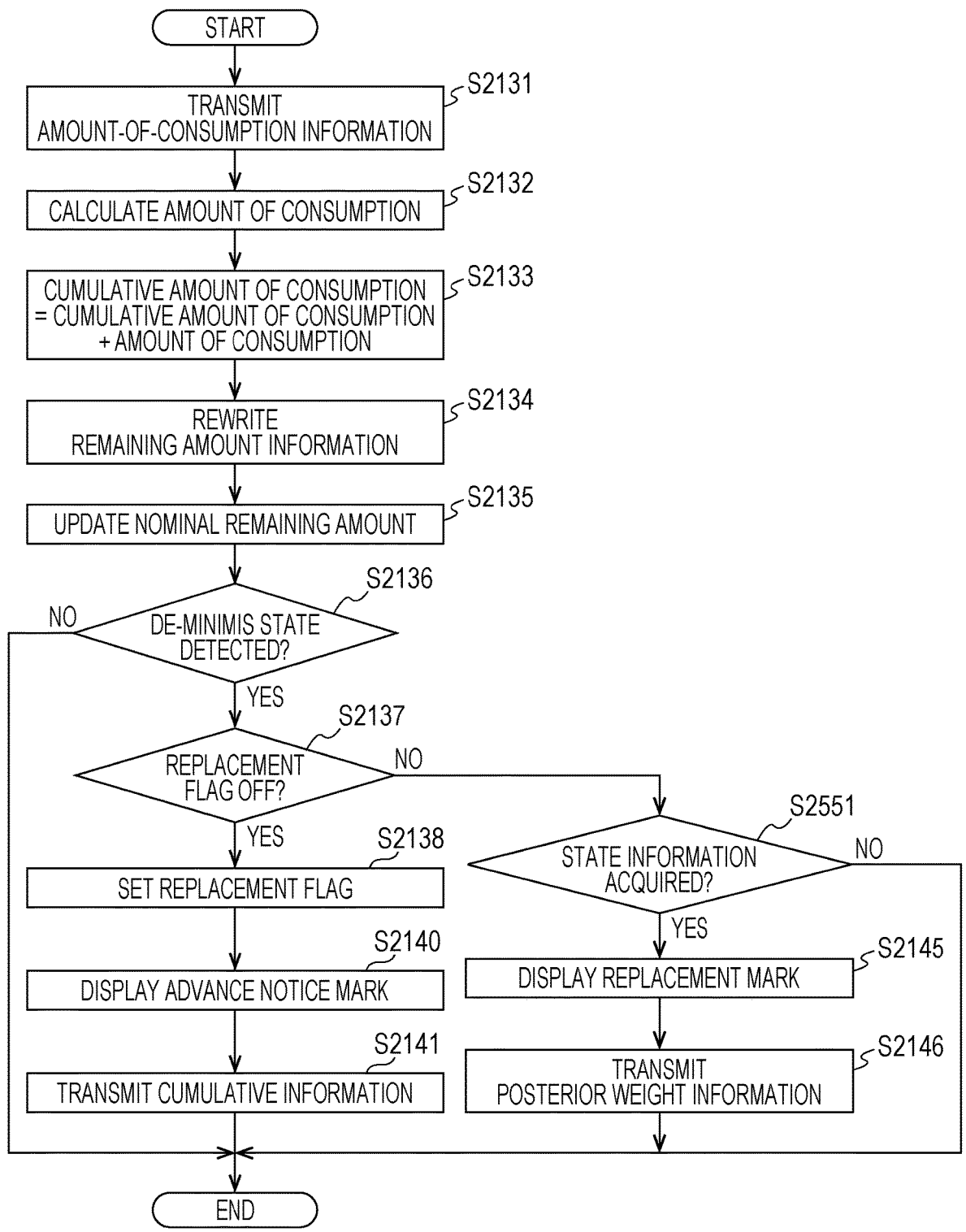
FIG. 20 is a flow chart showing a consumption routine that a print control section according to a sixth embodiment executes.

In the consumption routine according to the seventh embodiment, the process according to the third embodiment shown in FIG. 13 is executed with partial omission after the execution of a process which is similar to that according to the sixth embodiment shown in FIG. 20.

Figure 24:
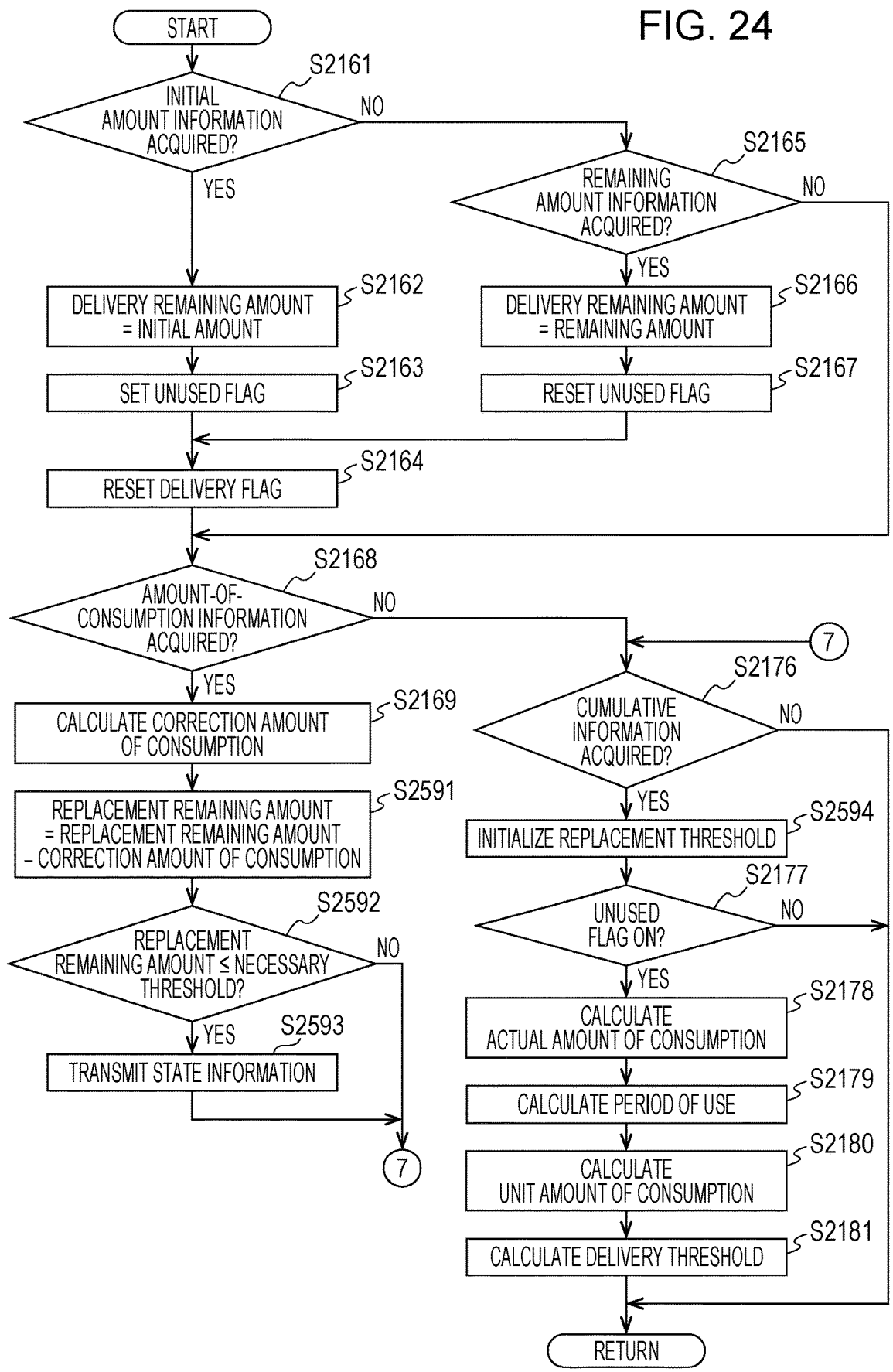
FIG. 24 is a flow chart showing a correction routine that a server control section according to the seventh embodiment executes.

Next, a correction routine that the server control section 217 executes is described with reference to a flow chart shown in FIG. 24.

Figure 21:
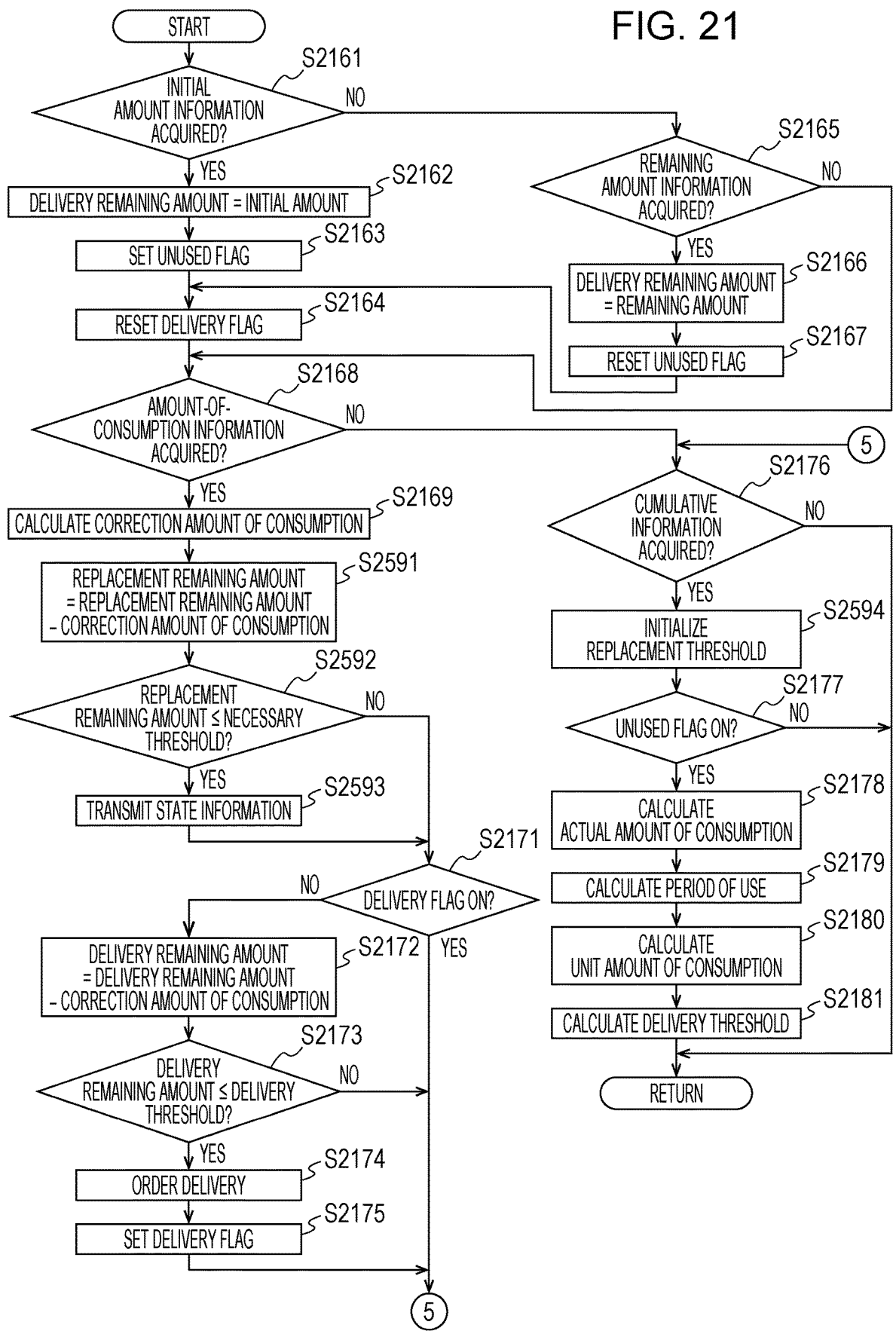
FIG. 21 is a flow chart showing a correction routine that a server control section according to the sixth embodiment executes.

In the correction routine according to the seventh embodiment, the correction routine shown in FIG. 21 according to the sixth embodiment is executed with partial omission.

The workings of the seventh embodiment are described.

The server control section 217 transmits state information related to the state of the printing material container 212 to the printing apparatus 213 based on contained amount information related to the amount of a printing material that the printing material container 212 contains and correction amount information. Upon acquiring the state information, the print control section 220 displays the replacement mark 237 on the display section 228 to notify a user that the printing material container 212 needs to be replaced. The print control section 220 orders the delivery terminal 215 to deliver a replacement printing material container that is inserted into the printing apparatus 213 to replace the printing material container 212 inserted in the mounting portion 223.

Eighth Embodiment

Next, an eighth embodiment of a server apparatus and a printing system is described with reference to the drawings. The eighth embodiment differs from the second embodiment in that the printing material container 212 can be replenished with a printing material and the print control section 220 executes a replenishment routine instead of the insertion routine. Some of the steps of the replenishment routine are the same as those of the insertion routine. Therefore, a repeated description is omitted by assigning identical reference signs to identical components and identical steps.

Figure 25:
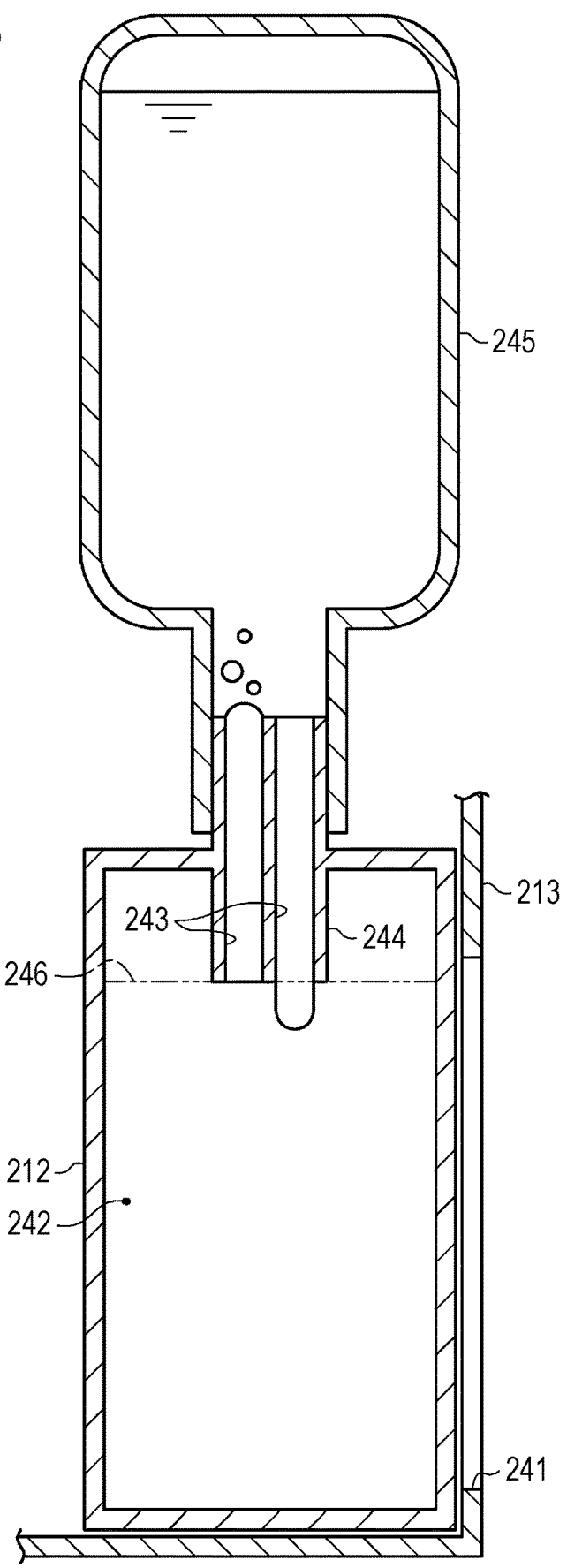
FIG. 25 is a schematic view showing a printing material container and a replenishment bottle according to an eighth embodiment.

As shown in FIG. 25, the printing material container 212 may be fixed to the printing apparatus 213. The printing apparatus 213 may have a window 241 through which a printing material contained in the printing material container 212 can be seen from outside.

The printing material container 212 may have a containing chamber 242 that contains a printing material and a tubular section 244 provided with a communication passage 243 that allows the containing chamber 242 to communicate with the outside. Replenishment of the printing material container 212 with a printing material may be performed by inserting, into the tubular section 244, a replenishment bottle 245 containing a replenishment printing material.

The communication passage 243 may have a lower end located below a ceiling of the containing chamber 242. The tubular section 244 may be provided with a plurality of the communication passages 243. For example, when the tubular section 244 is provided with two communication passages 243, one of the communication passages 243 serves as a supply passage through which a liquid printing material is supplied from the replenishment bottle 245 to the containing chamber 242. The other of the communication passages 243 serves as an exhaust passage through which gases are exhausted out of the containing chamber 242 into the replenishment bottle 245. When the containing chamber 242 is replenished with a printing material and a liquid level 246 of a liquid printing material contained in the containing chamber 242 rises to a position indicated by a chain double-dashed line in FIG. 25, the exhaust passage is closed by the printing material. This stops the exhaustion of gasses from the containing chamber 242 to the replenishment bottle 245. An increase in negative pressure in the replenishment bottle 245 leads to stoppage of the supply of a printing material from the replenishment bottle 245 to the containing chamber 242. This makes it possible to reduce variations in the amount of a printing material that the printing material container 212 contains upon completion of replenishment of the printing material container 212 with a printing material from the replenishment bottle 245.

Figure 26:
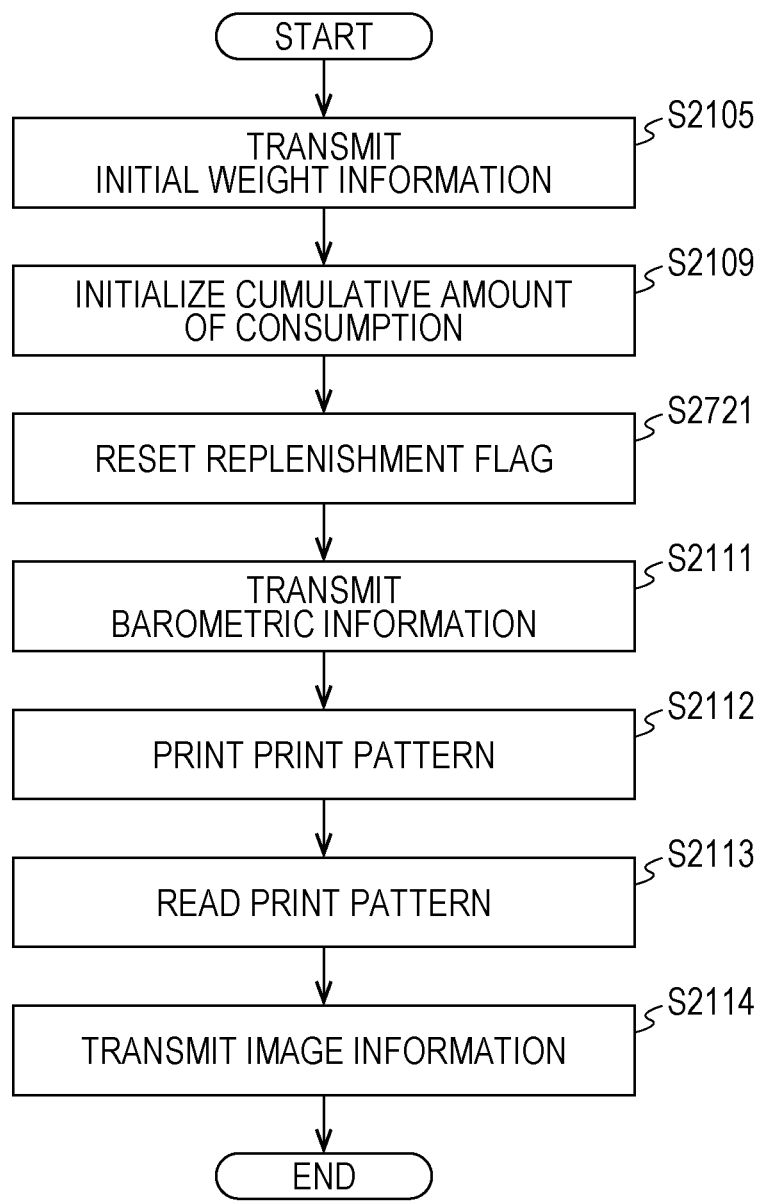
FIG. 26 is a flow chart showing a replenishment routine that a print control section according to the eighth embodiment executes.

The replenishment routine that the print control section 220 executes is described with reference to a flow chart shown in FIG. 26. The print control section 220 executes the replenishment routine upon replenishment of the printing material container 212 with a printing material. In the replenishment routine according to the eighth embodiment, the process in the insertion routine shown in FIG. 8 according to the second embodiment is partially omitted, and step S2721 is executed after step S2109. In step S2721, the print control section 220 resets a replenishment flag.

Next, a consumption routine that the print control section 220 executes is described with reference to a flow chart shown in FIG. 27.

Figure 27:
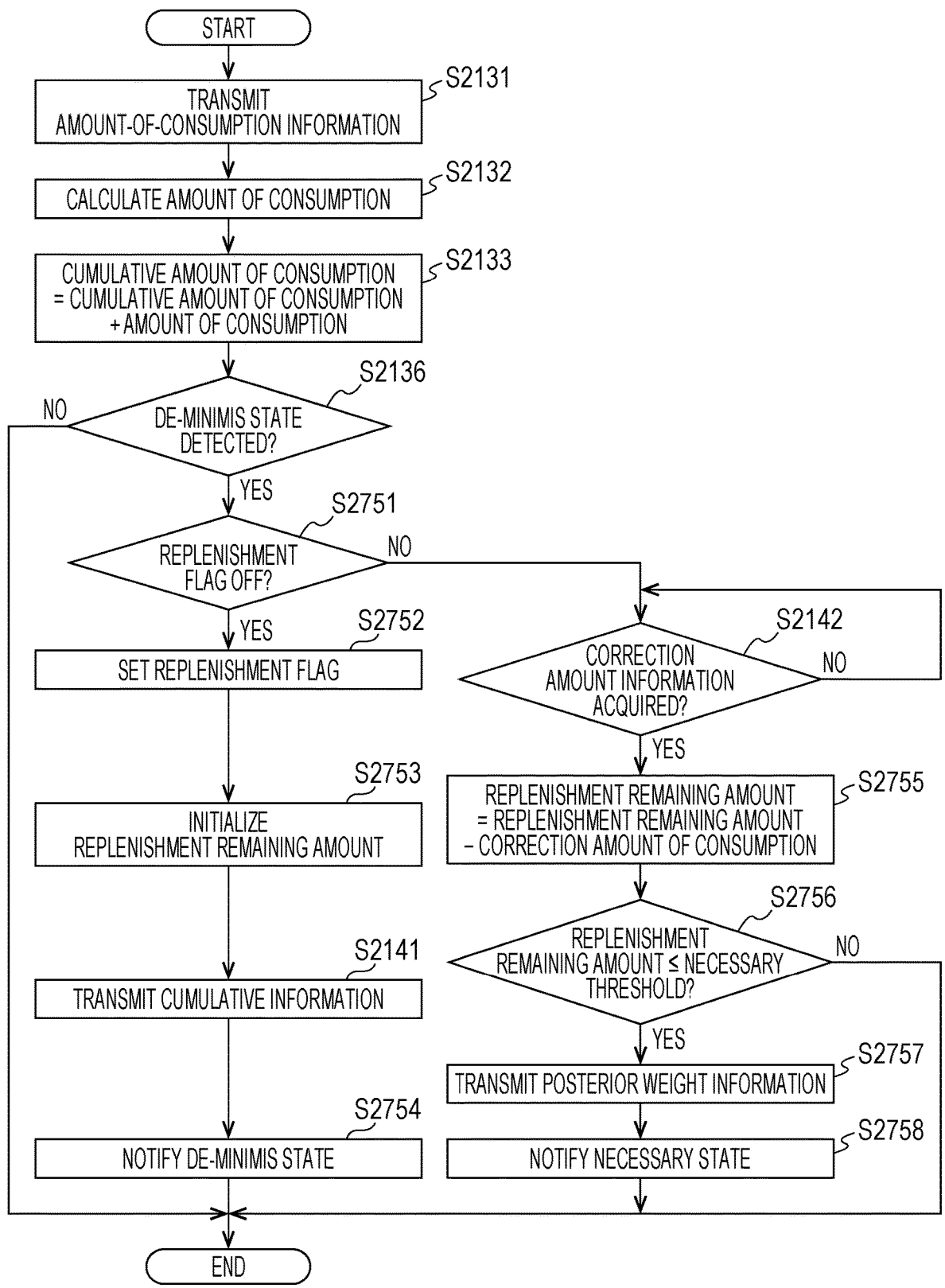
FIG. 27 is a flow chart showing a consumption routine that the print control section according to the eighth embodiment executes.

As shown in FIG. 27, the print control section 220 executes steps that are the same as steps S2131 to S2133 and S2136 shown in FIG. 9 according to the second embodiment and, when YES in step S2136, proceeds to step S2751.

In step S2751, the print control section 220 determines whether the replenishment flag is off. When the replenishment flag is off (YES in step S2751), the print control section 220 proceeds to step S2752.

In step S2752, the print control section 220 sets the replenishment flag. In step S2753, the print control section 220 initializes a replenishment remaining amount with the advance notice threshold (Replenishment remaining amount=Advance notice threshold). In step S2141, the print control section 220 transmits, to the server apparatus 214, cumulative information related to a cumulative amount of consumption. In step S2754, the print control section 220 notifies that the printing material container 212 is in a de-minimis state. Then, the print control section 220 ends the consumption routine.

When the replenishment flag is on in step S2751, (NO in step S2751), the print control section 220 proceeds to step S2142. In step S2142, the print control section 220 waits until it acquires correction amount information. When the print control section 220 acquires the correction amount information (YES in step S2142), the print control section 220 proceeds to step S2755.

In step S2755, the print control section 220 updates the replenishment remaining amount by subtracting, from a replenishment remaining amount stored therein, a correction amount of consumption indicated by the correction amount information thus acquired (Replenishment remaining amount=Replenishment remaining amount−Correction amount of consumption). In step S2756, the print control section 220 determines whether the replenishment remaining amount is equal to or smaller than the necessary threshold. When the replenishment remaining amount is larger than the necessary threshold (NO in step S2756), the print control section 220 ends the consumption routine. When the replenishment remaining amount is equal to or smaller than the necessary threshold (YES in step S2756), the print control section 220 proceeds to step S2757.

In step S2757, the print control section 220 causes the weight sensor 232 to measure the weight of the printing material container 212 and transmits the posterior weight information, which is an example of weight information related to the weight thus measured, to the server apparatus 214. In step S2758, the print control section 220 notifies that the printing material container 212 is in a necessary state in which the printing material container 212 needs to be replenished with a printing material. Then, the print control section 220 ends the consumption routine.

Figure 28:
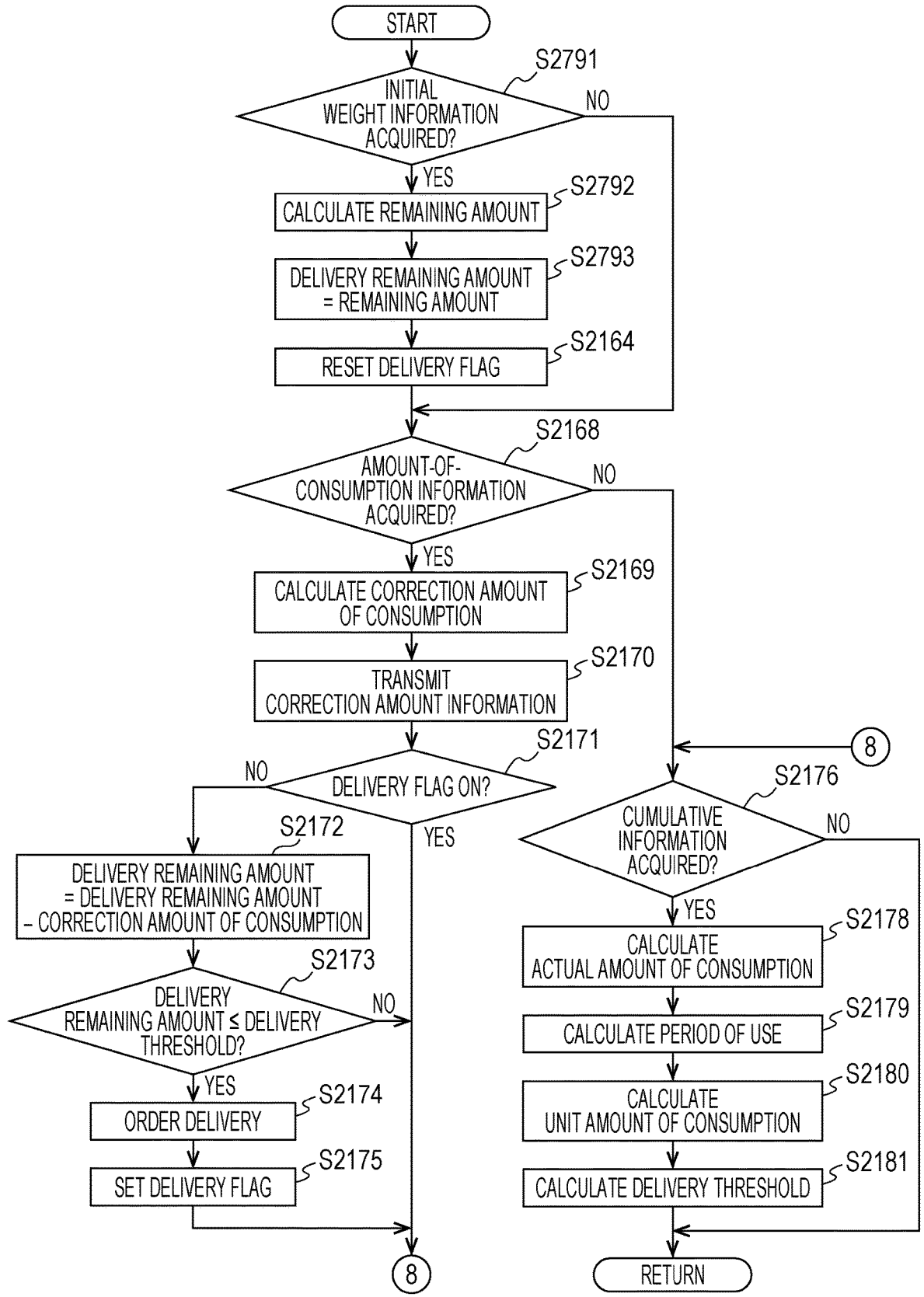
FIG. 28 is a flow chart showing a correction routine that a server control section according to the eighth embodiment executes.

Next, a correction routine that the server control section 217 executes is described with reference to a flow chart shown in FIG. 28.

In step S2791, the server control section 217 determines whether it has acquired initial weight information. When the server control section 217 has not acquired the initial weight information (NO in step S2791), the server control section 217 proceeds to step S2168. When the server control section 217 has acquired the initial weight information (YES in step S2791), the server control section 217 proceeds to step S2792. Note here that the initial weight information that the server control section 217 receives is transmitted by the print control section 220 in step S2105 shown in FIG. 26.

In step S2792, the server control section 217 calculates, from the initial weight information, the remaining amount of a printing material contained in the printing material container 212. That is, the remaining amount of the printing material is a value obtained by subtracting, from an initial amount indicated with the initial weight information, the weight of a housing of the printing material container 212. In step S2793, the server control section 217 rewrites the delivery remaining amount as the remaining amount thus calculated (Delivery remaining amount=Remaining amount). Then, the server control section 217 proceeds to step S2164.

In step S2174 according to the eighth embodiment, the server control section 217 orders the delivery terminal 215 to deliver a replenishment bottle 245 containing a printing material with which the printing material container 212 is replenished. In step S2178 according to the eighth embodiment, the server control section 217 calculates an actual amount of consumption by subtracting the advance notice threshold from the remaining amount calculated in step S2792.

The workings of the eighth embodiment are described.

The server control section 217 calculates correction amount information using correction information and amount-of-consumption information acquired from the printing apparatus 213 and transmits the correction amount information to the printing apparatus 213. The server control section 217 orders the delivery terminal 215 to deliver a replenishment bottle 245 for use in replenishment of the printing material container 212 inserted in the mounting portion 223.

The effects of the eighth embodiment are described.

(9) The delivery of a replenishment bottle 245 is ordered a delivery period earlier than a necessary time. The delivery period is a period of time required to deliver the replenishment bottle 245, and the necessary time is a time when replenishment with a printing material becomes necessary. This makes it possible to deliver the replenishment bottle 245 to a user of the printing apparatus 213 by the time when the remaining amount of a printing material that the printing material container 212 contains reaches the necessary threshold. This makes it possible to save the user the trouble of arranging the delivery of a replenishment bottle 245 and the trouble of managing inventory.

The eighth embodiment can be implemented as the following modifications. The eighth embodiment and the following modifications can be carried out in combination with each other as long as no technical contradiction arises.

The delivery terminal 215 may be connected to the server apparatus 214 without the network NT.

The delivery terminal 215 may be connected to the printing apparatus 213 without the network NT. The printing system 211 may cause the printing apparatus 213 to function as the delivery terminal 215. The server control section 217 may order the printing apparatus 213 to deliver a replacement printing material container or a replenishment bottle 245. The print control section 220 may notify a user of the printing apparatus 213 of the necessity to deliver a replacement printing material container or a replenishment bottle 245.

The server control section 217 or the print control section 220 may display, on the display section 228, a necessary time when it becomes necessary to replace the printing material container 212 or replenish the printing material container 212 with a printing material.

The server control section 217 or the print control section 220 may display, on the display section 228, a scheduled date of delivery of a replacement printing material container or a replenishment bottle 245.

A replacement printing material container or a replenishment bottle 245 may be prepared at an arbitrary timing by a user of the printing apparatus 213. In this case, the printing system 211 may be configured not to include the delivery terminal 215.

The delivery period may be a period of time including one day's leeway or more in addition to an actual delivery period that is a period of time required to deliver a printing material container 212.

Correction information may contain at least one of barometric information, weight information, cumulative information, and image information. The print control section 220 may transmit correction information together with amount-of-consumption information.

The print control section 220 may transmit barometric information at an arbitrary timing such as a time when the printing apparatus 213 has been installed, a time when the printing apparatus 213 has been powered on, a time when a printing material has been consumed, or a time when the user has ordered the transmission of barometric information.

The printing apparatus 213 may be configured not to include the barometric sensor 231. The print control section 220 may transmit, as barometric information, an atmospheric pressure inputted by the user.

The print control section 220 does not need to transmit barometric information. The atmospheric pressure of the place in which the printing apparatus 213 is installed varies depending upon altitude. Therefore, the server control section 217 may calculate an altitude from the address, zip code, or the like of the place in which the printing apparatus 213 is installed and acquire an atmospheric pressure from the altitude. The server control section 217 may calculate a correction amount of consumption and a correction coefficient according to the altitude of the place in which the printing apparatus 213 is installed.

The print control section 220 may transmit weight information related to the weight of the printing material container 212 at an arbitrary timing such as every day, every several days, or every predetermined period of time. The server control section 217 may calculate, from the difference between the weight indicated by the former weight information and the weight indicated by the latter weight information, an actual amount of consumption consumed during a period of time from acquisition of the former weight information to acquisition of the latter weight information. The server control section 217 may calculate a unit amount of consumption by dividing the actual amount of consumption by the period of time.

By dividing, by the unit amount of consumption, the remaining amount of a printing material contained in the printing material container 212, the print control section 220 or the server control section 217 may calculate an estimated usable period that is a period of time during which the printing material container 212 is usable. A time when the estimated usable period has elapsed since the estimated usable period was calculated is a necessary time at which it becomes necessary to replace the printing material container 212 or replenish the printing material container 212 with a printing material. The print control section 220 and the server control section 217 may order the delivery of a replacement printing material container or a replenishment bottle 245 a delivery period earlier than the necessary time. The delivery period is a period of time required to deliver the replacement printing material container or the replenishment bottle 245.

The printing apparatus 213 may be configured not to include the weight sensor 232. The weight of the printing material container 212 may be measured by the user. The print control section 220 may transmit, as weight information, the weight of the printing material container 212 inputted by the user.

The printing system 211 may collect a used printing material container 212. In this case, a collector who collected the used printing material container 212 may measure the weight of the printing material container 212. For example, the collector may transmit posterior weight information from the delivery terminal 215 to the server apparatus 214 or may directly input posterior weight information to the server apparatus 214.

The weigh contained in the posterior weight information is a sum of the weight of the housing of the printing material container 212 and the weight of a remaining printing material. Since the weight of the housing of the printing material container 212 is invariable, the weight of the remaining printing material can be calculated from the posterior weight information. The server control section 217 may calculate a correction amount of consumption using the posterior weight information. Specifically, when the weight of the remaining printing material is larger than the necessary threshold, the server control section 217 makes the correction amount of consumption smaller than the amount of consumption. That is, when the weight of the remaining printing material is larger than the necessary threshold, the server control section 217 makes the correction coefficient smaller than 1.

The print control section 220 may transmit image information at an arbitrary timing such as a time when the printing apparatus 213 has been installed, a time when the printing apparatus 213 has been powered on, a time when a printing material was charged, a time when a printing material has been consumed, a time when a predetermined period of time has elapsed, or a time when the user has ordered the transmission of image information.

The reading section 230 may be provided in a path of transportation of a medium to be subjected to printing. For example, provision of the reading section 230 between the discharge section 226, which prints on a medium, and an ejection section that ejects a medium makes it possible to efficiently perform printing and reading of a print pattern.

The printing apparatus 213 may be configured not to include the reading section 230. In the printing system 211, a reading device that reads an image of a medium may be provided separately from the printing apparatus 213, and printing and reading of a print pattern may be performed by the user.

When the printing apparatus 213 prints by discharging a plurality of types of printing material, the print control section 220 and the server control section 217 may make corrections for each printing material.

The storage medium 239 may store identification information that identifies the printing material container 212. When the printing material container 212 is inserted into the mounting portion 223, the print control section 220 may transmit, to the server control section 217, the identification information stored in the storage medium 239. The server control section 217 may authenticate whether a replacement printing material container whose delivery has been arranged is identical to the printing material container 212 inserted into the mounting portion 223.

When there is a difference between an amount of consumption calculated and an actual amount of consumption, the printing apparatus 213 may control driving of the discharge section 226 or the cleaning section 227 so that the actual amount of consumption matches the amount of consumption calculated. For example, when the amount of consumption calculated is smaller than the actual amount of consumption, the duration of a cleaning operation may be shortened.

The amount-of-consumption information may be print data. The server control section 217 may calculate the number of discharges based on the print data.

The printing material may be a liquid such as ink or may be a fluid such as toner. The printing apparatus 213 may be an apparatus, such as a serial printer, a lateral printer, a line printer, or a page printer, that prints an image such as a character, a picture, or a photograph by causing a liquid, a fluid, or the like to adhere to a medium. Further, the printing apparatus 213 may be an offset printing apparatus, a textile printing apparatus, or the like. The printing apparatus 213 needs only have at least a printing function of printing on a medium and may be a multifunction printer having a function besides the printing function.

The following describes technical ideas that are grasped from the aforementioned embodiments and modifications and working effects of the technical ideas.

(A) A server apparatus is a server apparatus that communicates with a printing apparatus having a printing section that prints on a medium, the server apparatus including: a storage section that stores apparatus information and user information in association with each other, the apparatus information being related to the printing apparatus, the user information being related to a user who uses the printing apparatus; a receiving section that receives apparatus information and associated information in association with each other, the apparatus information being transmitted from the printing apparatus, the associated information being transmitted from the printing apparatus and related to a regular cleaning of the printing section; a control section that determines, based on the associated information received by the receiving section, an execution condition for the regular cleaning, the regular cleaning being a cleaning that is regularly executed on the printing section; and a transmitting section that transmits, to the printing apparatus, the execution condition determined by the control section, wherein the apparatus information that is transmitted from the printing apparatus is first apparatus information, the apparatus information that the storage section stores is second apparatus information, the control section causes the execution condition thus determined and the user information associated with the second apparatus information that matches the first apparatus information to be stored in the storage section in association with each other, and the transmitting section transmits, to the printing apparatus having the first apparatus information that matches the second apparatus information associated with the user information, the execution condition associated with the user information.

According to the foregoing configuration, an execution condition is stored in the storage section in association with user information, and is transmitted to a printing apparatus having first apparatus information that matches second apparatus information associated with the user information. Therefore, for example, when a user has a plurality of printing apparatuses, i.e. when a plurality of pieces of second apparatus information are associated with the user information, one execution condition can be reflected in the plurality of printing apparatuses. This brings about improvement in user friendliness.

(B) In the server apparatus, the associated information may contain request information related to a user's request regarding the regular cleaning, and the request information may contain information related to at least one of an execution timing, an execution frequency, and an execution time of the regular cleaning.

According to the foregoing configuration, the control section determines an execution condition based on the request information. Therefore, the control section can determine an execution condition suited to the user's request.

(C) In the server apparatus, the request information may contain information related to the execution timing, and the execution timing may include at least one of a first timing from a time when the printing apparatus is powered on to a time when the printing section starts printing on a medium and a second timing at which the printing apparatus is powered off.

According to the foregoing configuration, the control section determines an execution condition based on the execution timing including at least one of the first timing and the second timing. Therefore, the control section can determine an execution condition suited to the execution timing for which the user requests.

(D) In the server apparatus, the associated information may contain an execution history of a user cleaning that is the cleaning that is executed in accordance with a user's instruction.

According to the foregoing configuration, the control section can determine an execution condition based on the execution history of the user cleaning.

(E) In the server apparatus, when, in the execution history, a frequency with which the user cleaning is executed at a first timing from a time when the printing apparatus is powered on to a time when the printing section starts printing on a medium exceeds a predetermined threshold, the control section may determine, based on the execution history, the execution condition under which to execute the regular cleaning at a time when the printing apparatus is powered on.

According to the foregoing configuration, for example, in the case of a user who has a habit of executing the user cleaning at a time when the printing apparatus is powered on, an execution condition under which to execute the regular cleaning at a time when the printing apparatus is powered on is determined. That is, an execution condition suited to the user's request is determined. This brings about improvement in usability.

(F) In the server apparatus, the association information may contain a printing frequency of the printing section, and the control section may determine, based on the printing frequency, the execution condition under which to execute the regular cleaning in a time period during which the printing frequency is lower than in a time period during which the printing frequency is highest.

According to the foregoing configuration, the execution of the regular cleaning in a time period during which the printing frequency is lower leads to a reduction in downtime of the printing apparatus by the regular cleaning.

(G) In the server apparatus, when the second apparatus information associated with the user information was updated to second apparatus information that is different from the second apparatus information, the transmitting section may transmit, to a printing apparatus having first apparatus information that matches the second apparatus information thus updated, the execution condition associated with the user information associated with the second apparatus information thus updated.

According to the foregoing configuration, for example, when the user has replaced the printing apparatus with a new one, the execution condition can be carried on into the new printing apparatus. This allows the user to reflect, in the new printing apparatus, an execution condition set in the hitherto-used printing apparatus. This brings about improvement in usability.

(H) In the server apparatus, when, with the user information associated with the second apparatus information, second apparatus information that is different from the second apparatus information was additionally associated, the transmitting section may transmit, to a printing apparatus having first apparatus information that matches the second apparatus information thus added, the execution condition associated with the user information associated with the second apparatus information thus added.

According to the foregoing configuration, for example, when the user has additionally bought a new printing apparatus, the user can reflect the execution condition in the new printing apparatus. This allows the user to reflect, in the new printing apparatus, an execution condition set in the hitherto-used printing apparatus. This brings about improvement in usability.

(I) A printing system is a printing system including: a printing apparatus; and a server apparatus that communicates with the printing apparatus, wherein the printing apparatus includes a printing section that prints on a medium, a cleaning section that executes a cleaning of the printing section either regularly or in accordance with a user's instruction, a first control section that controls the printing section and the cleaning section, a first transmitting section that transmits apparatus information and associated information in association with each other, the apparatus information being related to the printing apparatus, the associated information being related to a regular cleaning of the printing section, and a first receiving section that receives an execution condition for the regular cleaning, the execution condition being determined by the server apparatus based on the association information and transmitted from the server apparatus, the server apparatus includes a storage section that stores apparatus information and user information in association with each other, the apparatus information being related to the printing apparatus, the user information being related to a user who uses the printing apparatus, a second receiving section that receives the apparatus information and the associated information in association with each other, the apparatus information being transmitted by the first transmitting section, the associated information being transmitted by the first transmitting section, a second control section that determines the execution condition based on the associated information received by the second receiving section, and a second transmitting section that transmits, to the printing apparatus, the execution condition determined by the second control section, the apparatus information that the first transmitting section transmits is first apparatus information, the apparatus information that the storage section stores is second apparatus information, the storage section stores the execution condition and the user information in association with each other, the execution condition being determined by the second control section, the user information being associated with the second apparatus information that matches the first apparatus information received by the second receiving section, and the second transmitting section transmits, to the printing apparatus having the first apparatus information that matches the second apparatus information associated with the user information, the execution condition associated with the user information.

The foregoing configuration brings about the same effects as those of the aforementioned server apparatus.

(J) A management method is a management method for managing an execution condition for a regular cleaning, the management method including: receiving first apparatus information and associated information in association with each other, the first apparatus information being apparatus information related to a printing apparatus, the associated information being related to the regular cleaning of a printing section of the printing apparatus; determining the execution condition based on the associated information; in a database in which second apparatus information serving as apparatus information related to the printing apparatus and user information related to a user who uses the printing apparatus are held in association with each other, saving the execution condition and the user information in association with each other, the execution condition being determined based on the associated information, the user information being associated with the second apparatus information that matches the first apparatus information; and transmitting, to the printing apparatus having the first apparatus information that matches the second apparatus information associated with the user information, the execution condition associated with the user information.

The foregoing method brings about the same effects as those of the aforementioned server apparatus.

(K) A server apparatus is a server apparatus configured to communicate with a printing apparatus that performs printing with a printing material that is supplied from a printing material container containing the printing material, the server apparatus acquiring, from the printing apparatus, amount-of-consumption information related to an amount of consumption of the printing material that is consumed by the printing apparatus, the server apparatus calculating correction amount information related to a correction amount of consumption using correction information acquired from the printing apparatus and the amount-of-consumption information, the server apparatus transmitting the correction amount information to the printing apparatus.

According to this configuration, the server apparatus calculates correction amount information using amount-of-consumption information and correction information acquired from the printing apparatus and transmits the correction amount information to the printing apparatus. This makes it possible to, as compared with a case where the printing apparatus calculates correction amount information, reduce the discrepancy between the remaining amount of printing material calculated and the actual remaining amount of printing material while reducing the load on the printing apparatus.

(L) A server apparatus is a server apparatus configured to communicate with a printing apparatus that performs printing with a printing material that is supplied from a printing material container containing the printing material, the server apparatus acquiring correction information from the printing apparatus, the server apparatus calculating, using the correction information, a correction coefficient for correcting amount-of-consumption information related to an amount of consumption of the printing material that is consumed by the printing apparatus, the server apparatus transmitting the correction coefficient to the printing apparatus.

According to this configuration, the server apparatus calculates a correction coefficient using correction information acquired from the printing apparatus and transmits the correction coefficient thus calculated to the printing apparatus. By calculating a correction amount of consumption using the correction coefficient thus received, the printing apparatus can make the load of a process that is performed by the printing apparatus lighter than in a case where the printing apparatus calculates a correction coefficient. This makes it possible to reduce the discrepancy between the remaining amount of printing material calculated and the actual remaining amount of printing material while reducing the load on the printing apparatus.

(M) A server apparatus is a server apparatus configured to communicate with a printing apparatus that performs printing with a printing material that is supplied from a printing material container containing the printing material, the server apparatus acquiring, from the printing apparatus, amount-of-consumption information related to an amount of consumption of the printing material that is consumed by the printing apparatus, the server apparatus calculating correction amount information related to a correction amount of consumption using correction information acquired from the printing apparatus and the amount-of-consumption information, the server apparatus transmitting state information related to a state of the printing material container to the printing apparatus based on contained amount information related to an amount of the printing material that the printing material container contains and the correction amount information.

According to this configuration, the server apparatus transmits state information to the printing apparatus based on consumption amount information and correction information acquired from the printing apparatus and contained amount information related to the amount of a printing material that the printing material container contains. This makes it possible to, as compared with a case where the printing apparatus calculates state information, reduce the discrepancy between a calculated state of the printing material container and an actual state of the printing material container while reducing the load on the printing apparatus. This makes it possible to reduce the discrepancy between the remaining amount of printing material calculated and the actual remaining amount of printing material.

(N) In the server apparatus, the correction information may contain image information obtained by reading a print pattern printed by the printing apparatus.

The printing apparatus may print by causing a liquid droplet of printing material to adhere to a medium. The liquid droplet of printing material forms a dot when it adheres to the medium. The diameter of the dot that is formed on the medium varies according the amount of a printing material that constitutes the liquid droplet. Therefore, the amount of printing material per droplet can be calculated from the diameter of the dot. However, a process of calculating the diameter of the dot through analysis of an image and calculating the amount of printing material from the diameter of the dot imposes a heavy load. In that regard, the correction information contains image information obtained by reading a print pattern. This makes it possible to perform a heavy-load process with the server apparatus and reduce the load on the printing apparatus.

(O) In the server apparatus, the printing apparatus may include a detection section configured to detect a state of the printing material container, the detection section may be configured to detect a de-minimis state in which an amount of the printing material that the printing material container contains reaches an advance notice threshold that is larger than a necessary threshold at which the printing material container needs to be replaced or replenished with the printing material, and the correction information may contain cumulative information related to a cumulative amount of consumption during a period from start of use of the printing material container to detection of the de-minimis state by the detection section.

The amount of a printing material actually consumed during a period from the start of use of the printing material container to a de-minimis state can be calculated from the amount of a printing material that is contained in the printing material container at the start of use and the advance notice threshold. According to this configuration, the detection section detects that the printing material container is in a de-minimis state. The correction information contains cumulative information related to a cumulative amount of consumption during a period from the start of use of the printing material container to detection of a de-minimis state by the detection section. Accordingly, the server apparatus can compare the amount of a printing material actually consumed with the cumulative amount of consumption calculated, bringing about improvement in correction accuracy.

(P) In the server apparatus, the correction information may contain weight information on the printing material container.

According to this configuration, the correction information contains weight information on the printing material container. The weight of the printing material container decreases by the amount of a printing material supplied from the printing material container and consumed by the printing apparatus. Therefore, the amount of a printing material actually consumed can be calculated from the weight information. Accordingly, the server apparatus can compare the amount of a printing material actually consumed with the amount of consumption calculated, bringing about improvement in correction accuracy.

(Q) In the server apparatus, the correction information may contain barometric information on a place in which the printing apparatus is installed.

For example, in the printing apparatus 213, which prints by discharging a liquid printing material from the discharge section, the amount of a printing material that is consumed along with a cleaning of the discharge section may vary depending on the atmospheric pressure. In that regard, the correction information, which contains barometric information, brings about improvement in correction accuracy.

(R) The server apparatus may order delivery of a replacement printing material container or a replenishment bottle a delivery period earlier than a necessary time, the replacement printing material container being inserted into the printing apparatus to replace the printing material container, the replenishment bottle containing a printing material with which the printing material container is replenished, the delivery period being a period of time required to deliver the replacement printing material container or the replenishment bottle, the necessary time being a time when it becomes necessary to replace the printing material container or replenish the printing material container with the printing material.

According to this configuration, the delivery of a replacement printing material container or a replenishment bottle is ordered a delivery period earlier than a necessary period. The delivery period is a period of time required to deliver the replacement printing material container or the replenishment bottle, and the necessary time is a time when it becomes necessary to replace the printing material container or replenish the printing material container with a printing material. This makes it possible to deliver the replacement printing material container or the replenishment bottle to a user of the printing apparatus by the time when the remaining amount of a printing material that the printing material container contains reaches the necessary threshold. This makes it possible to save the user the trouble of arranging the delivery of a replacement printing material container or a replenishment bottle and the trouble of managing inventory.

(S) A printing system may include: the printing apparatus; and a server apparatus of the foregoing configuration.

This configuration brings about effects which are similar to those of the server apparatus.

(T) A printing system may be a printing system including: the printing apparatus; and a server apparatus of the foregoing configuration, wherein the printing apparatus may include a control section that orders delivery of a replacement printing material container that is inserted into the printing apparatus to replace the printing material container or a replenishment bottle containing a printing material with which the printing material container is replenished, and the control section may order the delivery of the replacement printing material container or the replenishment bottle a delivery period earlier than a necessary time, the delivery period being a period of time required to deliver the replacement printing material container or the replenishment bottle, the necessary time being a time when it becomes necessary to replace the printing material container or replenish the printing material container with the printing material.

This configuration brings about effects which are similar to those of the server apparatus.

What is claimed is:

1. A server apparatus that communicates with a printing apparatus having a printing section that prints on a medium, the server apparatus comprising:
    a storage section that stores apparatus information and user information in association with each other, the apparatus information being related to the printing apparatus, the user information being related to a user who uses the printing apparatus;
    a receiving section that receives apparatus information and associated information in association with each other, the apparatus information being transmitted from the printing apparatus, the associated information being transmitted from the printing apparatus and related to a regular cleaning of the printing section;
    a control section that determines, based on the associated information received by the receiving section, an execution condition for the regular cleaning, the regular cleaning being a cleaning that is regularly executed on the printing section; and
    a transmitting section that transmits, to the printing apparatus, the execution condition determined by the control section,
    wherein
    the apparatus information that is transmitted from the printing apparatus is first apparatus information,
    the apparatus information that the storage section stores is second apparatus information,
    the control section causes the execution condition thus determined and the user information associated with the second apparatus information that matches the first apparatus information to be stored in the storage section in association with each other, and
    the transmitting section transmits, to the printing apparatus having the first apparatus information that matches the second apparatus information associated with the user information, the execution condition associated with the user information.

2. The server apparatus according to claim 1, wherein
    the associated information contains request information related to a user's request regarding the regular cleaning, and
    the request information contains information related to at least one of an execution timing, an execution frequency, and an execution time of the regular cleaning.

3. The server apparatus according to claim 2, wherein
    the request information contains information related to the execution timing, and
    the execution timing includes at least one of a first timing from a time when the printing apparatus is powered on to a time when the printing section starts printing on a medium and a second timing at which the printing apparatus is powered off.

4. The server apparatus according to claim 1, wherein the associated information contains an execution history of a user cleaning that is the cleaning that is executed in accordance with a user's instruction.

5. The server apparatus according to claim 4, wherein when, in the execution history, a frequency with which the user cleaning is executed at a first timing from a time when the printing apparatus is powered on to a time when the printing section starts printing on a medium exceeds a predetermined threshold, the control section determines, based on the execution history, the execution condition under which to execute the regular cleaning at a time when the printing apparatus is powered on.

6. The server apparatus according to claim 1, wherein
    the association information contains a printing frequency of the printing section, and
    the control section determines, based on the printing frequency, the execution condition under which to execute the regular cleaning in a time period during which the printing frequency is lower than in a time period during which the printing frequency is highest.

7. The server apparatus according to claim 1, wherein when the second apparatus information associated with the user information was updated to second apparatus information that is different from the second apparatus information, the transmitting section transmits, to a printing apparatus having first apparatus information that matches the second apparatus information thus updated, the execution condition associated with the user information associated with the second apparatus information thus updated.

8. The server apparatus according to claim 1, wherein when, with the user information associated with the second apparatus information, second apparatus information that is different from the second apparatus information was additionally associated, the transmitting section transmits, to a printing apparatus having first apparatus information that matches the second apparatus information thus added, the execution condition associated with the user information associated with the second apparatus information thus added.

9. A printing system comprising:
    a printing apparatus; and
    a server apparatus that communicates with the printing apparatus,
    wherein
    the printing apparatus includes
        a printing section that prints on a medium,
        a cleaning section that executes a cleaning of the printing section either regularly or in accordance with a user's instruction,
        a first control section that controls the printing section and the cleaning section, a first transmitting section that transmits apparatus information and associated information in association with each other, the apparatus information being related to the printing apparatus, the associated information being related to a regular cleaning of the printing section, and a first receiving section that receives an execution condition for the regular cleaning, the execution condition being determined by the server apparatus based on the association information and transmitted from the server apparatus, the server apparatus includes a storage section that stores apparatus information and user information in association with each other, the apparatus information being related to the printing apparatus, the user information being related to a user who uses the printing apparatus, a second receiving section that receives the apparatus information and the associated information in association with each other, the apparatus information being transmitted by the first transmitting section, the associated information being transmitted by the first transmitting section, a second control section that determines the execution condition based on the associated information received by the second receiving section, and a second transmitting section that transmits, to the printing apparatus, the execution condition determined by the second control section, the apparatus information that the first transmitting section transmits is first apparatus information, the apparatus information that the storage section stores is second apparatus information, the storage section stores the execution condition and the user information in association with each other, the execution condition being determined by the second control section, the user information being associated with the second apparatus information that matches the first apparatus information received by the second receiving section, and the second transmitting section transmits, to the printing apparatus having the first apparatus information that matches the second apparatus information associated with the user information, the execution condition associated with the user information.

10. A management method for managing an execution condition for a regular cleaning, the management method comprising:

receiving first apparatus information and associated information in association with each other, the first apparatus information being apparatus information related to a printing apparatus, the associated information being related to the regular cleaning of a printing section of the printing apparatus;

determining the execution condition based on the associated information;

in a database in which second apparatus information serving as apparatus information related to the printing apparatus and user information related to a user who uses the printing apparatus are held in association with each other, saving the execution condition and the user information in association with each other, the execution condition being determined based on the associated information, the user information being associated with the second apparatus information that matches the first apparatus information; and transmitting, to the printing apparatus having the first apparatus information that matches the second apparatus information associated with the user information, the execution condition associated with the user information.

\* \* \* \* \*